(12) United States Patent
Mehta et al.

(10) Patent No.: US 10,650,020 B1
(45) Date of Patent: May 12, 2020

(54) ANALYZING TRANSFORMATIONS FOR PREPROCESSING DATASETS

(71) Applicant: Trifacta Inc., San Francisco, CA (US)

(72) Inventors: Vihang Jitendra Mehta, San Francisco, CA (US); Seshadri Sadasivan Mahalingam, San Francisco, CA (US); Philip John Vander Broek, San Francisco, CA (US)

(73) Assignee: Trifacta Inc., San Francisco, CA (US)

( * ) Notice: Subject to any disclaimer, the term of this patent is extended or adjusted under 35 U.S.C. 154(b) by 360 days.

(21) Appl. No.: 15/268,289

(22) Filed: Sep. 16, 2016

Related U.S. Application Data

(60) Provisional application No. 62/220,133, filed on Sep. 17, 2015.

(51) Int. Cl.
  *G06F 16/25* (2019.01)
  *G06F 16/904* (2019.01)

(52) U.S. Cl.
  CPC .......... *G06F 16/258* (2019.01); *G06F 16/904* (2019.01)

(58) Field of Classification Search
  CPC ......... G06F 17/30569; G06F 17/30994; G06F 16/258; G06F 16/904
  See application file for complete search history.

(56) References Cited

U.S. PATENT DOCUMENTS

| | | |
|---|---|---|
| 5,333,317 A | 7/1994 | Dann |
| 5,970,490 A * | 10/1999 | Morgenstern ......... G06F 16/258 |
| 2003/0167254 A1* | 9/2003 | Su ....................... G06F 17/2264 |
| 2007/0118452 A1 | 5/2007 | Mather et al. |
| 2007/0250855 A1 | 10/2007 | Quinn-Jacobs et al. |
| 2010/0223276 A1* | 9/2010 | Al-Shameri ...... G06F 17/30333 707/769 |
| 2011/0066602 A1* | 3/2011 | Studer ................. G06F 17/2264 707/690 |
| 2012/0246170 A1* | 9/2012 | Iantorno ............. G06F 11/3672 707/748 |
| 2014/0229491 A1* | 8/2014 | Bhattacharjee ... G06F 17/30569 707/748 |
| 2016/0092476 A1 | 9/2016 | Stojanovic et al. |

\* cited by examiner

*Primary Examiner* — Kris E Mackes
*Assistant Examiner* — Lin Lin M Htay
(74) *Attorney, Agent, or Firm* — Fenwick & West LLP

(57) ABSTRACT

A system analyzes transformations for processing datasets. The transformations may be used for build a transformation script for preprocessing data for analysis by big data analysis systems. The system receives a new transformation for analysis. The system determines a measure of an impact of the new transformation operation on a dataset. The system determines statistical information describing rows of the transformed dataset that are impacted by the new transformation. The system receives request to add the new transformation to the transformation script responsive to presenting the statistical information.

24 Claims, 19 Drawing Sheets

| | business_id | full_address | | hours | | categories | |
|---|---|---|---|---|---|---|---|
| | 662 Categories | 639 Categories | 19 Categories | 7 Keys | 2 Categories | 296 Unique Items | |
| 89 | Jp2liGPKOuCEiCDGNyovw | 3200 E Sky Harbor Blvd Ste 3300 Phoe... | | {} | | | |
| 90 | KEU36ohRQb19mrbA65Y3Q | 2957 W Bell Rd Phoenix, AZ 85053 | | {"Monday":{"close"... | true | ["American (Trad | |
| 91 | KF9RQPkmlOHfE0zUu9bg | 2910 N HAyden Rd Scottsdale, AZ 8525... | | {"Monday":{"close"... | false | ["Breakfast & Bru | |
| 92 | KR8uHx8mq-ogiFX7TlTlw | 8233 N 7th St Phoenix, AZ 85020 | | {} | true | ["Food", "Donuts" | |
| 93 | KSjEAnm5w8TBdRVLBwi9Q | 1528 E Southern Ave Tempe, AZ 85282 | | {} | true | ["Food", "Automot | |
| 94 | KZC-59mP5Kcr522k7W89w | 715 W Baseline Road Tempe, AZ 85283 | | {"Monday":{"close"... | true | ["Mexican", "Rest | |
| 95 | KcEUiwXi4uHoa6VV6KMuA | 7221 East Princess Blvd Suite 118 Sco... | | {} | true | ["Barbers", "Beau | |
| 96 | KySU-TyscoMMRNgzx4LaQ | 7014 Camelback Rd Scottsdale, AZ 85... | | {"Monday":{"close"... | true | ["Beauty & Spas" | |
| 97 | KzyOlFK4SM9l1vmuTSsuA | 4816 E Ray Rd Phoenix, AZ 85044 | | {} | true | ["Women's Clothi | |
| 98 | L39pGMPP1kM3DlOZ0oZ5w | 120 E Taylor St Phoenix, AZ 85004 | | {"Monday":{"close"... | true | ["Food", "Bakerie | |
| 99 | L_rzBx627AciFqZsPnsQQ | 7140 E Shea Blvd Scottsdale, AZ 85254 | | {} | true | ["Food", "Coffee" | |
| 100 | Lsdg-qAl_Lj3dj6vQI_Dg | 21001 N Tatum Blvd Phoenix, AZ 85050 | | {"Monday":{"close"... | true | ["Food", "Grocery | |
| 101 | LunygEbixqgJmmp6N801A | Phoenix, AZ 85018 | Phoenix | {} | true | ["Food", "Ice Cre | |
| 102 | M1rR1ip7NOlMn5EbUkuog | 11425 E Via Linda Scottsdale, AZ 85259 | | {"Monday":{"close"... | true | ["Carpet Install | |
| 103 | MFnc3jvLEdurqkOlayiHQ | 3893 S Arizona Ave Chandler, AZ 85286 | | {} | true | ["Fast Food", "Re | |
| 104 | MalpPCz4153Uh1pnzi3AA | 5350 E Marriott Dr Phoenix, AZ 85054 | | {"Monday":{"close"... | false | ["Burgers", "Sala | |
| 105 | Mf4i8jr_Vly37Z3Mgf0zQ | 409 N Scottsdale Rd Scottsdale, AZ 85... | | {} | true | ["American (Trad | |
| 106 | Mi86BZenY9lROFUdVy8bA | 2902 N 44th St Phoenix, AZ 85018 | | {"Monday":{"close"... | true | ["Banks & Credit | |
| 107 | N6XWiSuFKv-AXT7C3n6Yw | 2310 E Highland AAve Phoenix, AZ 85... | | {} | true | ["Hotels & Trave | |

TRANSFORM EDITOR extract col:full_address on:/^[a-zA-Z]*/ cancel    Add to Script

FIG. 10

| ABC business_id | Source ABC full_address | 639 Categories full_address | Preview full_address2 | 7 Keys hours | open | 2 Categories | 19 Categories categories |
|---|---|---|---|---|---|---|---|
| 1 -92fePi5W6MwCaxMxphFjA | Arrowhead Mall 7700 W Arrowhead To... | Arrowhead | {"Monday": {"close"... | | true | 296 Unique Items ["Food"] |
| 2 -LunygEblxqpinmp6N801A | Phoenix, AZ 85018 | Phoenix | {"Monday": {"close"... | | true | ["Carpet Install |
| 3 -R7PFBKnKNx6pOYpJdVTzA | Scottsdale, AZ 85259 | Scottsdale | {"Monday": {"close"... | | true | ["Food", "Food De... |
| 4 -ZXq0YMt2IOK4VRtqPcSCw | One E Washington Phoenix, AZ 85004 | One | {"Monday": {"close"... | | true | ["Shopping Cente... |
| 5 -v2x-BHCJawbCykFjEmHg | Lakeshore Towers 60 E Rio Salado Pk... | Lakeshore | {"Tuesday": {"close"... | | true | ["Web Design", "G... |
| 6 -bLYfQ30phOC_znU8vyCpg | University Dr Mesa, AZ 85203 | University | {"Monday": {"close"... | | true | ["Automotive", "A... |
| 7 -j3BF7gOi-1tAHoFA3Wlw | Charlie's Phoenix 727 W Camelback R... | Charlie | {"Sunday": {"close"... | | true | ["Mexican", "Food... |
| 8 -jcfE58jX6-7ZiGazWlgw | Scottsdale, AZ 85271 | Scottsdale | {"Monday": {"close"... | | true | ["Hotels & Trave... |
| 9 -sss6vsRYRvJgTRt5BawTw | Glendale, AZ 85308 | Glendale | {} | | true | ["Plumbing", "Hom... |
| 10 -tGrdYQlmuxhvKjQXScA5Q | Ahwatukee, AZ 85048 | Ahwatukee | {"Monday": {"close"... | | true | ["Local Services... |
| 11 -u-B9Rm3DHpLThpakVXH3w | Phoenix, AZ 85003 | Phoenix | {} | | true | ["Active Life", "... |
| 12 -vBrVSZBtqbDgPAbGQ4ZYQ | Phoenix, AZ 85034 | Phoenix | {"Monday": {"close"... | | true | ["Local Services... |
| 13 -zcZNlOOJwZHppan8rGk8Q | Phoenix Sky Harbor Intl Airport Termin... | Phoenix | {} | | true | ["American (Trad... |
| 14 02Fjjr_ccD42E-5aGOXWQ | Phoenix, AZ | Phoenix | {} | | true | ["Local Services... |
| 15 0BYd3_2b-OhB49F_QW2FA | Davis Miles McGuire Gardner, PLLC 8... | Davis | {"Tuesday": {"close"... | | true | ["Professional S... |
| 16 0KVhPwEheGiBU8vjw1kE1w | Phoenix, AZ | Phoenix | {} | | true | ["Food", "Special... |
| 17 0L3qEjF0jkFQkDiT4linUA | Glendale, AZ 85308 | Glendale | {} | | true | ["Home Services"... |
| 18 0NukiBoxwHZgBRpc1b8Skw | Phoenix, AZ | Phoenix | {} | | true | ["Hotels & Trave... |
| 19 0OPlZYPi3qmFvt_5RYB8LA | Phoenix, AZ 85003 | Phoenix | {} | | true | ["Flowers & Gift... |

TRANSFORM EDITOR extract col:full_address on:/^[a-zA-Z]?/    cancel | Add to Script

FIG. 11

| | Source | | Preview | |
|---|---|---|---|---|
| | ABC full_address | v | ABC full_address | |
| | | | 639 Categories | 19 Categories |
| | | | | Arrowhead |
| 1 | Arrowhead Mall 7700 W Arrowhead To... | | | Arrowhead |
| 2 | Phoenix, AZ 85018 | | | Phoenix |
| 3 | Scottsdale, AZ 85259 | | | Scottsdale |
| 4 | One E Washington Phoenix, AZ 85004 | | | One |
| 5 | Lakeshore Towers 60 E Rio Salado Pk... | | | Lakeshore |
| 6 | University Dr Mesa, AZ 85203 | | | University |
| 7 | Charlie's Phoenix 727 W Camelback R... | | | Charlie |
| 8 | Scottsdale, AZ 85271 | | | Scottsdale |
| 9 | Glendale, AZ 85308 | | | Glendale |
| 10 | Ahwatukee, AZ 85048 | | | Ahwatukee |
| 11 | Phoenix, AZ 85003 | | | Phoenix |
| 12 | Phoenix, AZ 85034 | | | Phoenix |
| 13 | Phoenix Sky Harbor Int'l Airport Termin... | | | Phoenix |
| 14 | Phoenix, AZ | | | Phoenix |
| 15 | Davis Miles McGuire Gardner, PLLC 8... | | | Davis |
| 16 | Phoenix, AZ | | | Phoenix |
| 17 | Glendale, AZ 85308 | | | Glendale |
| 18 | Phoenix, AZ | | | Phoenix |
| 19 | Phoenix, AZ 85003 | | | Phoenix |

TRANSFORM EDITOR extract col:full_address on:^[a-zA-Z]+

| | bus ∨ | | localhost:3005/data/5/5 | | | | | ☆ | | | | | | |
|---|---|---|---|---|---|---|---|---|---|---|---|---|---|---|
| New | Sample 1 - First 500kB ∨ | 15 Columns | 663 Rows | 7 Data Types | ∨ | Grid ∨ Rows: ✓All | | Transformed - 183 Rows | | | Run Job | | | |
| | Preview | | | | | | | | | | Filter in grid | | | |
| | ABC business_id | ∨ | ABC full_address | | | hours | ∨ | open ∨ | | categories | ∨ | ABC city | ∨ | |
| | 662 Categories | | 639 Categories | | | 7 Keys | | 2 Categories | | 296 Unique Items | | 30 Categories | | |
| 1 | -4Pe8BZ6gj57vFL5mUE6g | | 21001 North Tatum Blvd #24 Phoenix, AZ 85050 | | | {} | | true | | ["Shopping", "Office Eq... | | Phoenix | | |
| 2 | -5jkZ3-nUPZxdJvtcbr8Uw | | 1336 ₳ North Scottsdale Rd Scottsdale, AZ 8525... | | | {"Monday":{"close"... | | true | | ["Greek", "Restaurants"] | | Scottsdale | | |
| 3 | -BivDO_RG2yEiKu9XA1_g | | 14870 ₳ North:Northsight Blvd Ste 103 Scottsd... | | | {"Monday":{"close"... | | true | | ["Sushi Bars", "Hawaiia... | | Scottsdale | | |
| 4 | -Oi5mVSMaW8ExtmWRUmKA | | 7110 E Thomas Rd Ste D Scottsdale, AZ 85251 | | | {"Monday":{"close"... | | true | | ["Barbers", "Beauty &... | | Scottsdale | | |
| 5 | -XBxRiD92RaV5TyUnP8Ow | | 7510 W Thomas Rd Ste 108 Phoenix, AZ 85033 | | | {} | | true | | ["Shopping", "Mobile P... | | Phoenix | | |
| 6 | -eiGtjp5iVWXeeCnhVNRA | | 5237 W Glendale Ave Glendale, AZ 85301 | | | {"Monday":{"close"... | | true | | ["Pets", "Pet Stores"] | | Glendale | | |
| 7 | -qeSYxyn62mMjWvznNTdg | | 1747 E Florence Blvd Casa Grande, AZ 85122 | | | {} | | true | | ["Chinese", "Restaurants"] | | Casa Grande | | |
| 8 | -0D_CYhiD2iLkmLR0pBmnA | | 9832 W Northern Ave Ste 1660 Peoria, AZ 85345 | | | {"Monday":{"close"... | | true | | ["Food", "Specialty Food"] | | Peoria | | |
| 9 | -0QBrNvhrPQCaeo7mTo0zQ | | 2526 W Van Buren Street Phoenix, AZ 85009 | | | {} | | true | | ["Restaurants"] | | Phoenix | | |
| 10 | -0bUDim5OGuv8R0Qqq6J4A | | 7023 ₳ North:19th Ave Phoenix, AZ 85021 | | | {"Monday":{"close"... | | true | | ["Bakeries", "Food"] | | Phoenix | | |
| 11 | -0xwm_AwS0d_5rwJprHGuw | | 1710 W Southern Ave Ste B7 Mesa, AZ 85202 | | | {"Monday":{"close"... | | true | | ["Food", "Coffee & Tea"] | | Mesa | | |
| 12 | -1-sUowC71J-cn7mCxvJ5w | | 7121 E 5th Ave Ste 1 Scottsdale, AZ 85251 | | | {"Monday":{"close"... | | true | | ["Shopping"] | | Scottsdale | | |
| 13 | -1N0Z3uM8xbvKS8XiAnaog | | 7047 E Greenway Parkway Suite 250 Scottsdal... | | | {} | | true | | [] | | Scottsdale | | |
| 14 | -1bOb2izeJBZjHC7NVWxiPA | | 61 W Thomas Road Phoenix, AZ 85013 | | | {"Monday":{"close"... | | true | | ["Breakfast & Brunch"... | | Phoenix | | |
| 15 | -1qDkiczWpxON-3_Nj9NgA | | 525 W Broadway Rd Tempe, AZ 85282 | | | {"Monday":{"close"... | | true | | ["Fast Food", "Restaur... | | Tempe | | |
| 16 | -24urjUhdfbFW43xD8I-aA | | 1900 W Germann Rd Ste 3 Chandler, AZ 85286 | | | {"Monday":{"close"... | | true | | ["Active Life", "Yoga"... | | Chandler | | |
| 17 | -2_03_WKgO5ln5XO5extNQ | | 1107 E Bell Rd Ste 16 Phoenix, AZ 85022 | | | {"Tuesday":{"close"... | | true | | ["Food", "Ethnic Food"... | | Phoenix | | |
| 18 | -2xCV0XGD9NxrfWaVwA1-DQ | | 9008 ₳ North:99th Ave Peoria, AZ 85345 | | | {} | | true | | ["Pizza", "Restaurants"] | | Peoria | | |
| 19 | -34jE_5dujSWMlOBudQsiQ | | 9377 E Bell Rd Scottsdale, AZ 85260 | | | {} | | true | | ["Doctors", "Health &... | | Scottsdale | | |

TRANSFORM EDITOR replace col/full_address with 'North' on /\bN /

1410                                    1420

Cancel    Add to Script

ANALYZING TRANSFORMATIONS FOR PREPROCESSING DATASETS

CROSS-REFERENCE

This application claims the benefit of U.S. Provisional Application No. 62/220,133, filed on Sep. 17, 2015, which is incorporated by reference in its entirety.

BACKGROUND

The disclosure relates in general to preprocessing data for analysis by big data analysis systems, for example, parallel and distributed systems and more specifically to analyzing transformations for developing transformation scripts for preprocessing data.

Organizations generate large amount of data during their normal operations. Data may be generated by systems as a result of transactions performed within the organization, as a result of interactions with external systems, by sensors, by manual entry of data, and so on. This data often includes structured data as well as unstructured and/or semi-structured data stored in a wide variety of formats.

Organizations perform data mining operations on the data generated to extract different types of information. This includes information indicating health of various components of the organization, information predicting performance of various projects within the organization, information describing allocation of resources within the organization, and so on. Big data analysis systems process the huge amount of data being generated by organizations. These big data analysis systems typically use parallel and distributed systems to process the data. Big data analysis systems typically need the data to be available in a specific format to be able to analyze that data and exploit the parallelism inherent in the data.

However the quality of raw data that is generated by various systems within the organization is often poor. In other words, raw data generated by the disparate sources within the organization is not in a format that can be readily processed by big data systems. Such raw data often contains missing fields, data anomalies, erroneous values, duplicate values, nested structures that cannot be processed by the big data analysis system, data that does not conform to certain type constraints, and so on. The amount of data that is in a proper format that can be processed by big data systems is often a fraction of the overall data available. The quality of results obtained by analyzing the data is limited by the amount of data that the big data system can process.

The amount of data that can be processed by the big data systems can be improved by preprocessing the raw data by transforming the data to a form that can be efficiently processed by the big data systems. Preprocessing of data requires performing transformations to the data to bring the data to a desired form. Automatic transformation of data requires generation of scripts for performing the transformations. Developing these transformation scripts is often a tedious and time consuming process that requires experts who can analyze the data and developers who can write the scripts. As a result, cleaning data generated by organizations is often an expensive process.

SUMMARY

Embodiments determine transformation operations for processing datasets, for example, for generating a transformation script for preprocessing datasets in preparation for big data analysis. A system receives information identifying a dataset. The system stores a transformation script for processing the dataset. The transformation script includes a sequence of transformation operations. The system applies the set of transformation operations to the dataset to obtain a transformed dataset. The system identifies rows of the transformed sample that are impacted by the new transformation. The impacted rows comprise rows of the transformed sample that cause the condition of the new transformation to evaluate to true. The system determines statistical information describing rows of the transformed dataset that are impacted by the new transformation and presents the statistical information. The system receives a request to include the new transformation in the transformation script. The system adds the new transformation to the transformation script responsive to the request.

In an embodiment, the system further preprocesses the input dataset using the transformation script and sends the preprocessed input dataset for analysis by the data analysis system.

In an embodiment, the dataset is a first sample of a larger dataset. The system further receives a request for a second sample having a particular rate of impact of the transform. The system sends a request to the server for a second sample set. The request identifies the new transformation operation and the set of transformation operations. The system receives the second sample of dataset from the server. The server determines the second sample by applying the set of transformation operations to at least a portion of the dataset to obtain a transformed subset of the dataset.

An online system, such as a social networking system, monitors user interactions with the social networking system and determines emotional states of users of the social networking system based on the user interactions.

BRIEF DESCRIPTION OF DRAWINGS

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The disclosed embodiments have other advantages and features which will be more readily apparent from the detailed description, the appended claims, and the accompanying figures (or drawings). A brief introduction of the figures is below.

FIG. 4 shows a screenshot of a user interface illustrating various interactions with the data preprocessing system, according to an embodiment.

FIG. 9 shows a user interface illustrating impact of an extract transformation operation, according to an embodiment.

FIG. 10 shows a user interface showing only rows impacted by an extract transformation operation, according to an embodiment.

FIG. 11 shows a user interface showing only rows and columns impacted by an extract transformation operation, according to an embodiment.

FIG. 12 shows a user interface illustrating impact of a keep transformation operation, according to an embodiment.

FIG. 13 shows a user interface showing only rows impacted by a keep transformation operation, according to an embodiment.

FIG. 14 shows a user interface illustrating impact of a replace transformation operation, according to an embodiment.

FIG. 15 shows a user interface showing only rows impacted by a replace transformation operation, according to an embodiment.

FIG. 18 shows a user interface showing only rows and columns impacted by a split transformation operation, according to an embodiment.

Figure 1:
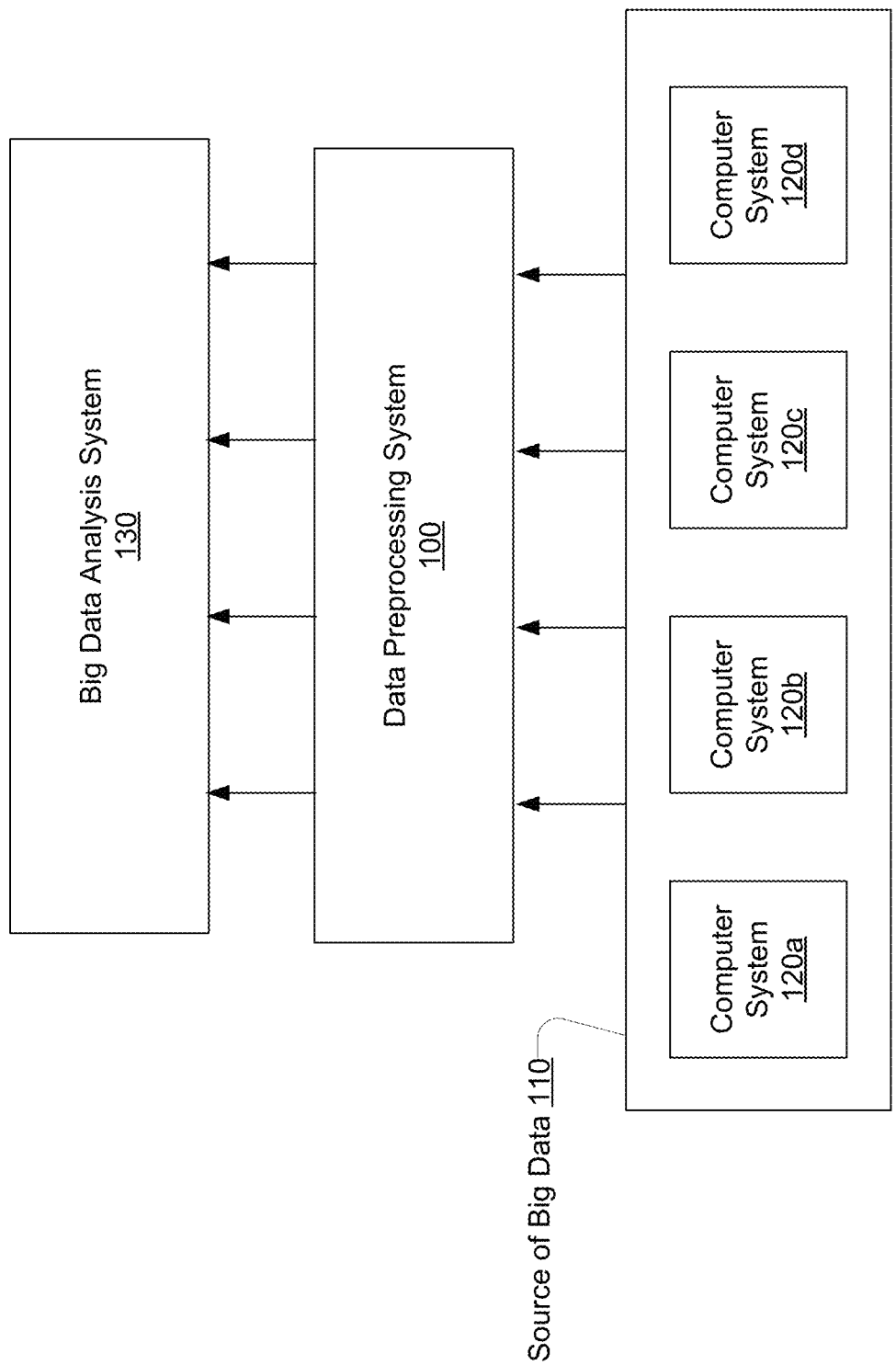
FIG. 1 shows the overall system environment for performing big data analysis, according to an embodiment.

The steps of processes illustrated as flowcharts described herein can be executed in an order different from that described herein. Furthermore, actions described as being executed by certain software modules may be executed by other software modules than those indicated herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

Embodiments of the invention allow users to analyze transformation operations used in a transformation script used for preprocessing datasets before performing big data analysis of the dataset. A system receives a sample of a dataset and interacts with the user to develop a transformation script for preprocessing the dataset for big data analysis. The system interacts with a user performing analysis of the dataset for determining the transformations to be added to the transformation script. The sample of the dataset is transformed into a transformed sample as the transformation script is developed by applying the transformations of the transformation script to the sample. A transformation is associated with a condition based on one or more attributes of the dataset such that the transformation performs an action for a row if the condition evaluates to true for the attribute values of the row. The system identifies rows of the transformed dataset being analyzed for which the condition evaluates to true and marks these rows as the rows impacted by the transformation.

The system provides statistical information describing the impacted rows. For example, the system provides the number of rows or columns of the transformed sample that are impacted by the transformation operation. The system also modifies histograms of attributes based on a frequency of impacted rows associated with the range of attribute values of a bar of a histogram of an attribute. The system allows further interactions based on the statistical information. For example, the system allows users to view all rows impacted by a transform or all rows not impacted by the transform. The system allows users to request a sample that shows a higher rate of impact based on the transformation. The system allows users to filter rows based on interactions of the users with the bars of the bar chart. For example, a user may select a bar of a bar chart associated with an attribute that indicates high impact rate based for a transform to modify the transform or add a new transform that filters rows based on the range of attribute values for the bar.

System Environment for Big Data Analysis

FIG. 1 shows the overall system environment for performing big data analysis, according to an embodiment. FIG. 1 shows various systems involved in generation of and processing of big data. The overall system environment includes a source of data 110, a data preprocessing system 100, and a data analysis system 130. In other embodiments, more or fewer systems/components than those indicated in FIG. 1 may be used. For example, the various systems shown in FIG. 1 may interact via a network (not shown in FIG. 1). Furthermore, there may be more or fewer instances of each system shown in FIG. 1, for example, there may be multiple instances of big data analysis systems 130. The big data analysis system may also be referred to herein as a data analysis system, analysis system, or a system.

FIG. 1 and the other figures use like reference numerals to identify like elements. A letter after a reference numeral, such as "120*a*," indicates that the text refers specifically to the element having that particular reference numeral. A reference numeral in the text without a following letter, such as "120," refers to any or all of the elements in the figures bearing that reference numeral (e.g. "120" in the text refers to reference numerals "120*a*" and/or "120*b*" in the figures).

The source of big data 110 may be an organization or enterprise that uses multiple computer systems 120 for processing data of the organization or enterprise. Each computer system 120 performs activities that result in generation of data. For example, a computer system 120 may perform transactions and generate logs based on the transactions. Another computer system (or systems) may process and generate data based social interactions by logging actions performed by users. Another computer system 120 may process, generate, and store images. The data available in the computer systems 120 is analyzed by the big data analysis system 130.

Since the amount of data generated by such sources of data can be large and unstructured, conventional analysis tools, for example, reporting systems based on database queries are often not capable of processing this data. As a result, big data analysis systems 130 are used that are often parallel and distributed systems and are capable of processing unstructured data. Big data analysis systems 130 typically analyze big data to perform data mining operations, predictive analysis, forecasting, text mining, and so on. For example, large amount of data representing sales, interactions between users, and so on may be used to derive sales trends among different types of consumers, to predict success of different sales or marketing campaigns, and so on.

The raw data produced by source of big data 110 often includes records that are not in a form in which the big data analysis system 130 can process the data. The big data analysis system 130 typically requires the input data to conform to certain formatting rules. The formatting rules may be specific to certain columns of a dataset or may apply to multiple columns. A formatting rule may specify various constraints applicable to a particular type of data. For example, a column storing address may have several constraints, for example, the values in a state field must be a valid state (given a country), the zip code must be from a valid set of zip codes and also must conform to the format of the country, and so on.

The sources of big data 110 often produce data in formats that are not anticipated by the big data analysis system 130. Following is an example illustrating non-conformance of raw data with respect the formatting rules of a big data analysis system 130. The big data analysis system 130 may expect a particular field to be numeric whereas various data records obtained from the source of big data 110 may include alphabetic characters or even special characters. Similarly, the big data analysis system 130 may expect a field to store URLs (uniform resource locators) and not all values of the field produced by the source of big data 110 may include URLs in a proper format. As another example, the big data analysis system 130 may assume one or more different formats of addresses for an address field and the raw data may include addresses that do not conform to these formats of addresses.

The data preprocessing system 100 performs processing of the raw data obtained from the sources of big data 110 to transform the raw data into a format that is suitable for consumption by the big data analysis system 130 (i.e., a format that conforms to the formatting rules of the big data analysis system 130.) For example, if the raw data includes URLs that do not conform to the standard URL format, the data preprocessing system 100 transforms the data to generate URL in a format that can be processed by the big data analysis systems 130. For example, assume that several URL fields include values of the form "http;//xyz.com" where the prefix "http" is followed by ";" instead of ":". This may happen, for example, if the URLs are obtained from logs based on URL values manually entered by users (that include commonly occurring typos.)

The step of preprocessing the data is also referred to as cleansing the data by modifying data that does not satisfy various formatting criteria that determine whether the data can be processed by the big data analysis system 130. For example, end users often make mistakes while entering URLs, thereby introducing incorrect URL values in the data. However, the data entered by the user is still valuable information since the system can derive information based on the fact that the user intended to enter a specific URL. The intended URL may be obtained by performing a transformation of the incorrect URL field that replaces ";" by ":". The data preprocessing system 100 may include a large number of such transform operations that pre-process the raw data produced by sources of big data 110.

The transformation operations may be provided by experts that review the data produced by the big data source 110. A transformation operation may also be referred to herein as a transform or a transform operation. The data preprocessing system 100 may include transform operations based on commonly occurring patterns of bad data typically generated by sources of big data 110. Accordingly, the data preprocessing system 100 takes raw data generated by sources of big data 110 and prepares (or preprocesses) the data so as to transform the raw data for consumption by big data analysis system 130.

The data preprocessing system 100 may not be able to transform all available raw data to a format that conforms to the formatting rules of the big data analysis system. For example, certain fields may store values from which no meaningful information may be deciphered. However, even if the data preprocessing system 100 is able to preprocess a portion of raw data, the amount of information available to the big data analysis system 130 increases by certain amount.

As an example, assume that the big data analysis system is able to process 50% of the raw data generated by the source of big data without any preprocessing. The remaining 50% of the raw data is assumed to be bad raw data that does not conform to the formatting rules of the big data analysis system 100. Assume that the data preprocessing system 100 is able to transform 80% of the bad raw data to a form that can be processed by the big data analysis system 130 but is unable to decipher the remaining 20% of the bad raw data. In this situation, even though the data preprocessing system 100 is unable to decipher 20% of the bad raw data, the data preprocessing system 100 helped increase the amount of data that can be processed by the big data analysis system 130 to 90% of the original raw data. As a result, the big data analysis system 130 is likely to be able to generate more accurate information or derive new information based on the additional data that the big data analysis system 130 is able to process.

Embodiments allow users to interact with datasets to build transformation scripts that are used by the data preprocessing system 100 to preprocess data received from sources 110. The data preprocessing system 100 presents users with samples of data sets and provides a user interface for analyzing the data by providing information describing impact of a new transformation operation on a dataset. The data preprocessing system 100 automatically generates transformation operations based on user interactions. The data preprocessing system 100 presents the automatically generated transformation operations to users and receives selections of one or more automatically generated transformation operations. The data preprocessing system 100 adds the selected transformation operations to the transformation script. The data preprocessing system 100 executes the transformation script on the complete dataset to preprocess the dataset for processing by the big data analysis system 130.

System Environment for Data Preprocessing

Figure 2:
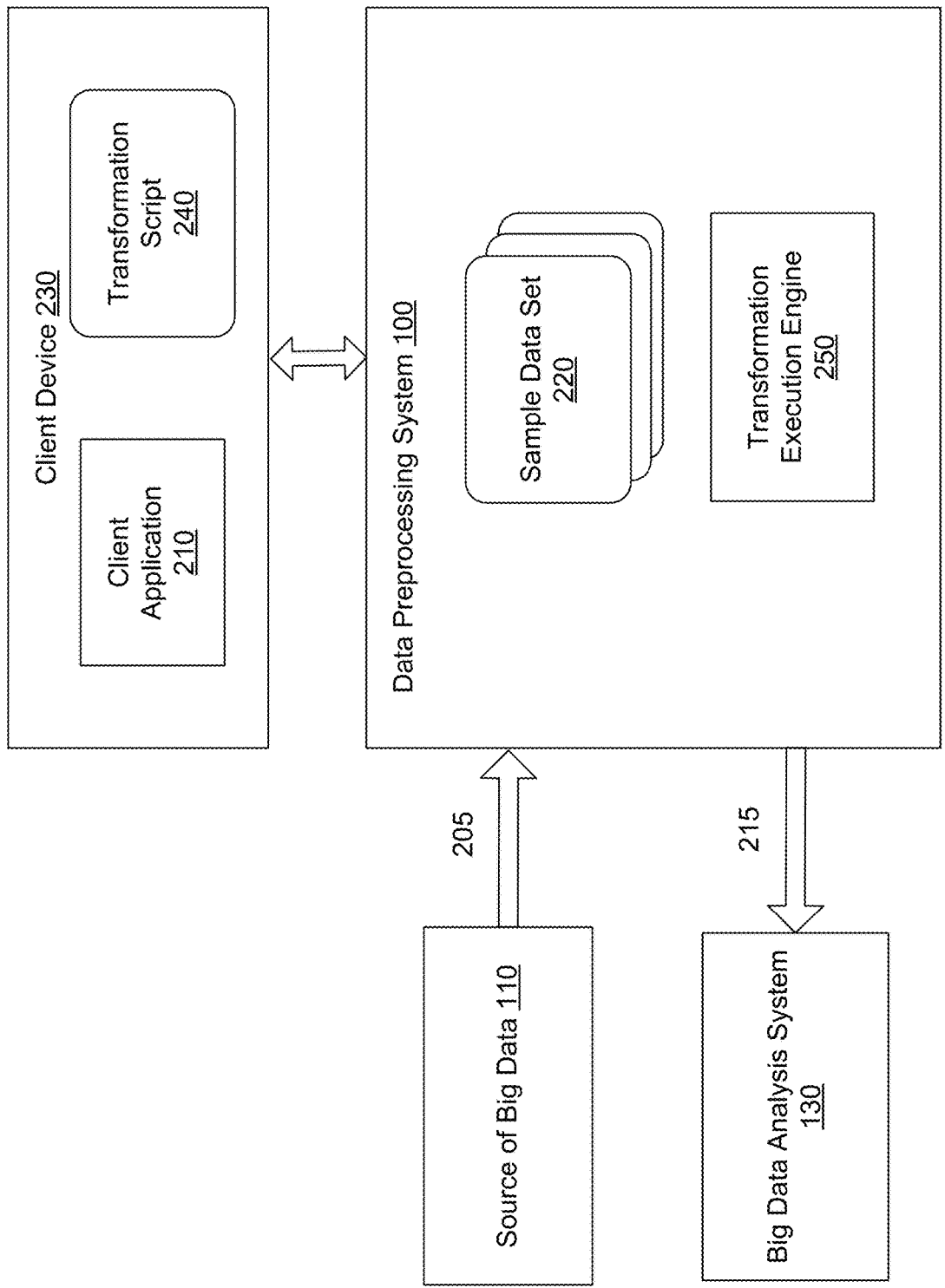
FIG. 2 shows the overall system environment illustrating details of data preprocessing system for preprocessing data for big data analysis, according to an embodiment.

FIG. 2 shows the overall system environment illustrating details of a data preprocessing system for preprocessing data for big data analysis, according to an embodiment. As described in connection with FIG. 1, the data preprocessing system 100 receives 205 data from sources of big data 110, preprocesses the data to improve the amount of data that conforms to the formatting constraints of the big data analysis system 130 and provides 215 the preprocessed data to the big data analysis system 130.

The data preprocessing system 100 configures for presentation, a user interface for interfacing with the data preprocessing system and presents the user interface to users via the client device 230, for example, as client application 210. The client device 230 executes the client application 210, thereby allowing a user to interact with the data preprocessing system 100, for example, to develop and/or test a transformation script 240 used for preprocessing the data. The transformation script 240 includes a set of transform operations (or a sequence of transform operations that are executed in a particular order.) The client application 210 may be an internet browser that interacts with the data preprocessing system 100 via internet. Alternatively, the client application 210 may be a custom application that interacts with the data preprocessing system 100 using internet or proprietary communication protocols.

The client application 210 includes various software modules, for example, a software module that includes instructions for analyzing transformation operations. The client application 210 receives requests for analyzing impact of a transformation operation on a sample dataset 220. In an embodiment, the client application 210 executes steps of analysis of the impact of the transformation on the client device, for example, within the client application 210. In other embodiments, the client application 210 sends a request to the data preprocessing system 100 for performing steps of analysis of the impact of the transformation operation on the sample dataset 220. Alternatively, the client application 210 may execute some of the steps of analysis of the impact of the transformation on the client device and some using the data preprocessing system 100.

The client application 210 determines rows of a dataset that are impacted by a transformation operation. The measure of impact of a transformation may depend on the type of transformation. For example, for certain transformation operations, the client application 210 identifies rows that are processed by the transformation to generate an output. The client application 210 may measure impact of a transformation based on rows of the dataset for which the transformation generates an output value distinct from a corresponding attribute value of the row. The client application 210 may measure impact of a transformation based on rows of the dataset for which the transformation generates a non-null or non-empty result. The client application 210 may measure impact of a transformation based on rows of the dataset that match with at least a row of another dataset (when the transformation combines two datasets using, for example, a join operation.) The client application 210 may measure impact of a transformation based on rows of the dataset for which a condition associated with the transformation evaluates to true.

In an embodiment, the client application 210 provides statistical information describing the impact of a transformation operation, for example, number of rows impacted by the transformation and/or number of columns impacted by the transformation. A row or a column is considered impacted by a transformation operation if a value of the row or column is impacted by the transformation. The client application 210 further receives requests from the users for presenting a subset of rows or columns of the sample data set that were (or were not) impacted by the transformation operation. For example, if a sample dataset includes one thousand rows, and 20 rows are impacted by the transformation, the client application 210 identifies the impacted 20 rows rather than requiring the user to scroll through the thousand rows of the sample to identify the impacted rows.

In one embodiment, a computer system executing code for the data preprocessing system 100 or the client device 230 is a computer system executing, for example, a Microsoft Windows-compatible operating system (OS), Apple OS X, and/or a Linux distribution. In another embodiment, the computer system can be a device having computer functionality, such as a personal digital assistant (PDA), mobile telephone, video game system, etc. The computer system includes a non-transitory storage medium storing instructions that perform the various steps described herein. The client application 210 makes the client device 230 a special purpose computer system for performing analysis of data for preprocessing. Similarly, the computer system of the data preprocessing system 100 stores modules such as transformation execution engine 250 and transform analyzer 200 that make the data preprocessing system 100 a special purpose computer system for performing preprocessing of data. The various systems shown in FIG. 2 may interact via a network (not shown in the figure.) The network enables communications between the various systems.

The data preprocessing system 100 receives datasets for processing from the sources of big data 110. A dataset comprises one or more attributes. In an embodiment, the attributes of the dataset are represented as columns and the dataset is represented as a set of columns. A column comprises a set of cells, each cell storing a cell value. Accordingly, the dataset may be represented as rows and column, where each row corresponds to a tuple including a value of each attribute.

The data obtained from the sources 110 of big data is typically too large to be viewed in a reasonable time by a user for purposes of preprocessing the data. In an embodiment, the data preprocessing system 100 receives requests from the user to generate sample datasets 220. The data preprocessing system 100 presents user interfaces to a user via the client application 210 to receive requests from the user for developing the transformation script. The requests for developing the transformation script include reviewing a sample dataset, analyzing impact of transformation operations on the sample of dataset, executing a transformation command on the sample dataset, and determining whether to add the transformation command to the transformation script.

The transformation execution engine 250 executes one or more transformation commands or a transformation script against a sample dataset 220 or against the entire dataset received from a source of big data 110. In some embodiments, the execution of the transformation script on the entire dataset is performed by a system different from the data preprocessing system 100. The execution of the transformation script on the entire dataset may be performed as an offline (or batch process) that does not require interactions with users once the execution is started.

The process of developing the transformation script is an iterative process that may require several interactions between the data preprocessing system 100 and the user via the client application 210. Once the transformation script 240 is finalized, the data preprocessing system 100 executes the transformation script 240 against the entire dataset received from the source of big data 110. The result of the execution of the transformation script 240 against the entire dataset is presented to the big data analysis system 130. This provides the big data analysis system 130 with data that has a much larger percentage of data that conforms to the formatting rules of the big data analysis system compared to the raw data provided by the sources of big data 110.

System Architecture of the Data Preprocessing System

Figure 3A:
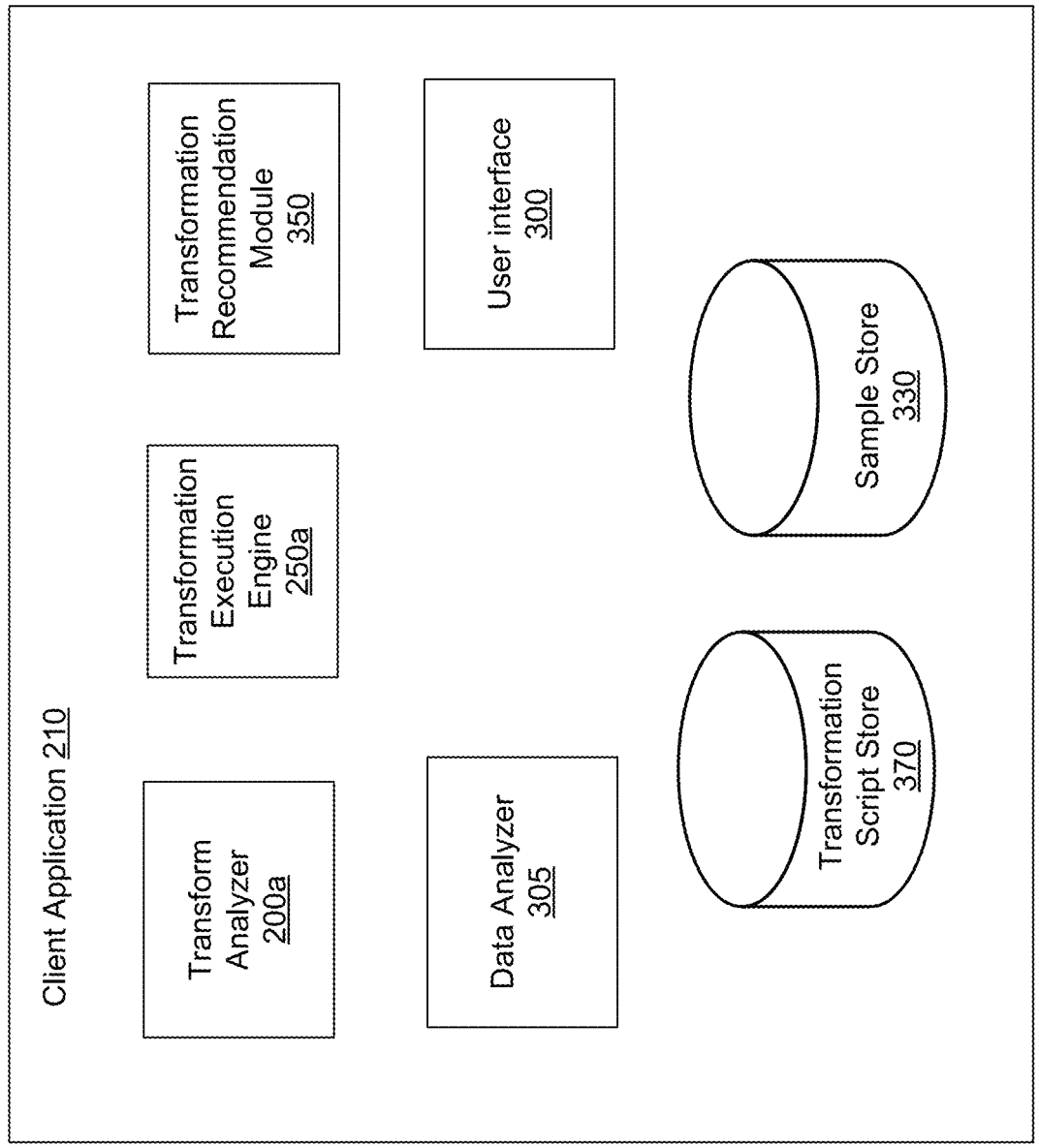
FIG. 3A shows architecture of a client application for interacting with a data processing system for developing transformation scripts for preprocessing data for big data analysis, according to an embodiment.

FIG. 3A shows architecture of a client application for interacting with a data processing system for developing transformation scripts for preprocessing data, according to an embodiment. The client application 210 includes a transform analyzer 200a, a transformation execution engine 250, a transformation recommendation module 350, a transformation script store 370, a user interface 300, a data analyzer 305, and a sample store 330. In other embodiments, the data preprocessing system 100 may include other modules not described herein. Functionality indicated as provided by a particular module may be implemented by other modules instead.

The transform analyzer 200 performs various operations for analyzing a transformation operation. The transform analyzer 200 receives a transformation operation from the user interface 300. The transformation operation may be a selection of a transformation operation recommended by the transformation recommendation module 350 described below or a manually entered transformation operation provided by a user. The transform analyzer 200 parses the transformation operation to identify the type of transformation operation and various components of the transformation operation. In an embodiment, the transform analyzer 200 builds a parse tree representation or any in-memory data structure for representing the transformation operation that provides access to the various components of a transformation operation.

Examples of transformation operation include the following. An extract operation extracts a portion of a data value that matches a regular expression into a new column. The components of the extract operation include a column being processed and a regular expression to specify the portion of the values being extracted. An example of an extract transformation is "extract column:<column_name> on:<regular_expression>", where the "extract" keyword identifies the operation, the "column" keyword helps identify the column name (or attribute name) being processed, and the "on" keyword is associated with the regular expression specified.

A keep transform filter rows of a dataset that satisfy a specified condition. An example of a keep transformation is "keep row: matches(col1, term1)" which specifies that all rows in which column "col1" has a substring match for the specified term "term1" will; be kept in the result set and the rest deleted.

A replace transform replaces a term (i.e., a substring) from values stored in a column with another term. For example, "replace column:col1 on:term1 with:term2" specifies that execution of this transformation operation will cause all substring matches of term1 in column col1 with term2.

A split transform splits a value into two or more values at a separator. For example, the transformation "split column: col1 on: '.' splits values in column col1 into multiple values if the term '.' occurs in the value. For example, a value "31.52" is split into two values "31" and "52". However a value "341" is not split because the term '.' does not occur in this value.

The transform analyzer 200 identifies a condition for a given transformation operation. In an embodiment, the transform analyzer 200 includes instructions to identify conditions associated with transforms of a given type. For example, the transform analyzer 200 maintains a mapping from types of transformation operations to sets of instructions identifying the condition based on the specification of the transformation operation. For example, if the transformation operation performs a replace operation on an attribute that replaces occurrences of a term T1 with term T2, the transform analyzer 200 determines the condition for the transform operation to evaluate to true if the attribute value includes the term T1 and false otherwise. A transform that performs a delete operation deletes all occurrences of an input term. The transform analyzer 200 generates a condition that evaluates to true if the input term occurs in an attribute value. The transform analyzer 200 treats the delete transform as a replace transform that replaces occurrences of term T1 with a null or empty string.

As another example, assume that the transformation operation performs a split operation based on a separator term such that the transformation operation splits an attribute value into a substring that occur before the separator and a substring that occurs after the separator term (for example, a split operation based on separator ':' splits the attribute value "abc:xyz" into two substrings "abc" that occurs before the separator ':' and "xyz" that occurs after the separator ':". The transform analyzer 200 determines the condition for the transformation operation to evaluate to true if the separator term occurs in the attribute value and false otherwise.

As another example, a transformation operation performs join of a source dataset with a target dataset. The join may be inner join or outer join. The transform analyzer 200 determines the condition for this transformation operation to evaluate to true for a row of the source dataset if a matching row of the target dataset exists that satisfies the join condition. As another example, an unnest transform identifies occurrences of a nested structure and unnests various attributes occurring within the nested structure. The transform analyzer 200 generates a condition that evaluates to true if an attribute value is determined to include the nested structure and false otherwise.

The transform analyzer 200 also evaluates rows of a sample that satisfy a given condition associated with a transformation operation. In an embodiment, the transform analyzer 200 selects each row of an input dataset and evaluates the condition associated with the transformation operation to determine whether the condition evaluates to true. If the condition evaluates to true for a row, the transform analyzer 200 determines that the row is impacted by the transformation.

The user interface 300 presents information describing the dataset to the user and provides various widgets for allowing users to interact with the data. The information describing the dataset includes a textual representation of the data as well as charts describing the data. The user interface 300 presents transformation recommendations to the user and receives selections of transformation recommendations. The user interface 300 allows users to enter transformations manually via a text box.

The data analyzer 305 performs various types of analysis of the data of the sample of dataset being processed by the client application 210. For example, the data analyzer 305 determines the frequency of occurrence of various values of an attribute to provide information for displaying a histogram representing the attribute. The data analyzer 305 also determines statistics representing impacted rows for a transform, for example, number of rows or columns of a sample that are impacted by a transform.

If the user interface 300 presents a histogram for an attribute, the data analyzer 305 determines the number of impacted rows/columns/values per bar of the histogram. For example, if each bar of the histogram is associated with a range of attribute values, the data analyzer 305 determines the number of impacted rows per range of the attribute values. The data analyzer provides the information to the user interface 300. The user interface 300 modifies the histogram based on the frequency of impacted rows. The user interface 300 presents the histogram such that a bar associated with N impacted rows is shown distinct from a similar bar having M impacted rows where M and N are distinct values. For example, a bar associated with more impacted rows is shown with a darker color (or a darker shading) compared to a bar with fewer impacted rows. Alternatively, each bar shows the number of impacted rows using text associated with the bar. Alternatively, different ranges of number of impacted rows are associated with different colors and the bars of the histogram are color coded accordingly. The embodiments are described for modifying a histogram based on number of impacted rows. However these techniques can be used to modify the histogram similarly based on number of impacted columns or number of impacted values.

The transformation execution engine 250 receives transformations and executes the transformations for a given set of input datasets. In an embodiment, the transformation execution engine 250 receives a transformation script and executes the transformation script for a given set of input datasets. The transformation execution engine 250 includes instructions to execute various operators associated with the transformations. Examples of operators (or transformations based on the operators) include replacing a substring with another string, replacing a character with another character or string, replacing a substring at a particular location by another string (the location determined by identifying a character/substring and indicating whether the substring to be replaced occurs before/after the identified character/substring), splitting a column based on a separator into multiple columns, extract a substring from an attribute, joining two or more datasets based on join keys, aggregating records, grouping records, determining aggregate values of a column for groups of records based on certain criteria, filtering records based on certain criteria such that only records satisfying the given criteria are output by the transform operation, extracting an attribute within a composite attribute as a new column of the dataset, and so on.

The sample store 330 stores samples of various datasets stored in the dataset store 380. The data preprocessing system 100 provides these samples for use in developing and testing transformation scripts. The data preprocessing system 100 uses sample sets for development and testing of transformation scripts because the entire dataset received for processing may be very large. As a result, development and testing of transformation scripts based on an entire dataset may be slow since execution of each transformation on the entire dataset may take a long time. Samples stored in the sample store 330 may be determined by the sampling module 360 or by the transformation based sampling modules 340. The transformation scripts may be used for preprocessing datasets received for data analysis using the datasets, for example, using big data analysis systems 130.

The transformation script store 370 stores transformation scripts being developed by a user using the client application 210. The transformation script store 370 may represent each script as a sequence of transformation operations. The transformation script store 370 may associate each transformation operation of a transformation script with a sequence number representing an order in which the transformation operations are executed in the transformation script. In an embodiment, the transformation store 370 stores individual transformations using a text format, for example, a syntax of a proprietary script, syntax of a standard programming language, or using markup languages such as XML (extensible markup language).

The transformation recommendation module 350 presents users with various transformations that can be used for processing data of a dataset in a given context. The transformation recommendation module 350 may generate recommendations in response to certain user actions, for example, a selection of a data element or a portion of data element by the user. For example, assume that the user interface manager 310 receives a user selection of a portion of a data value "???" in a data element of a column specified using the client application 210. The user interface manager 310 provides information indicating the data value selected, the column of the data value, and so on. The transformation recommendation module 350 identifies various data transforms applicable to the user selection and sends them for display to the user via the user interface manager 310.

Figure 3B:
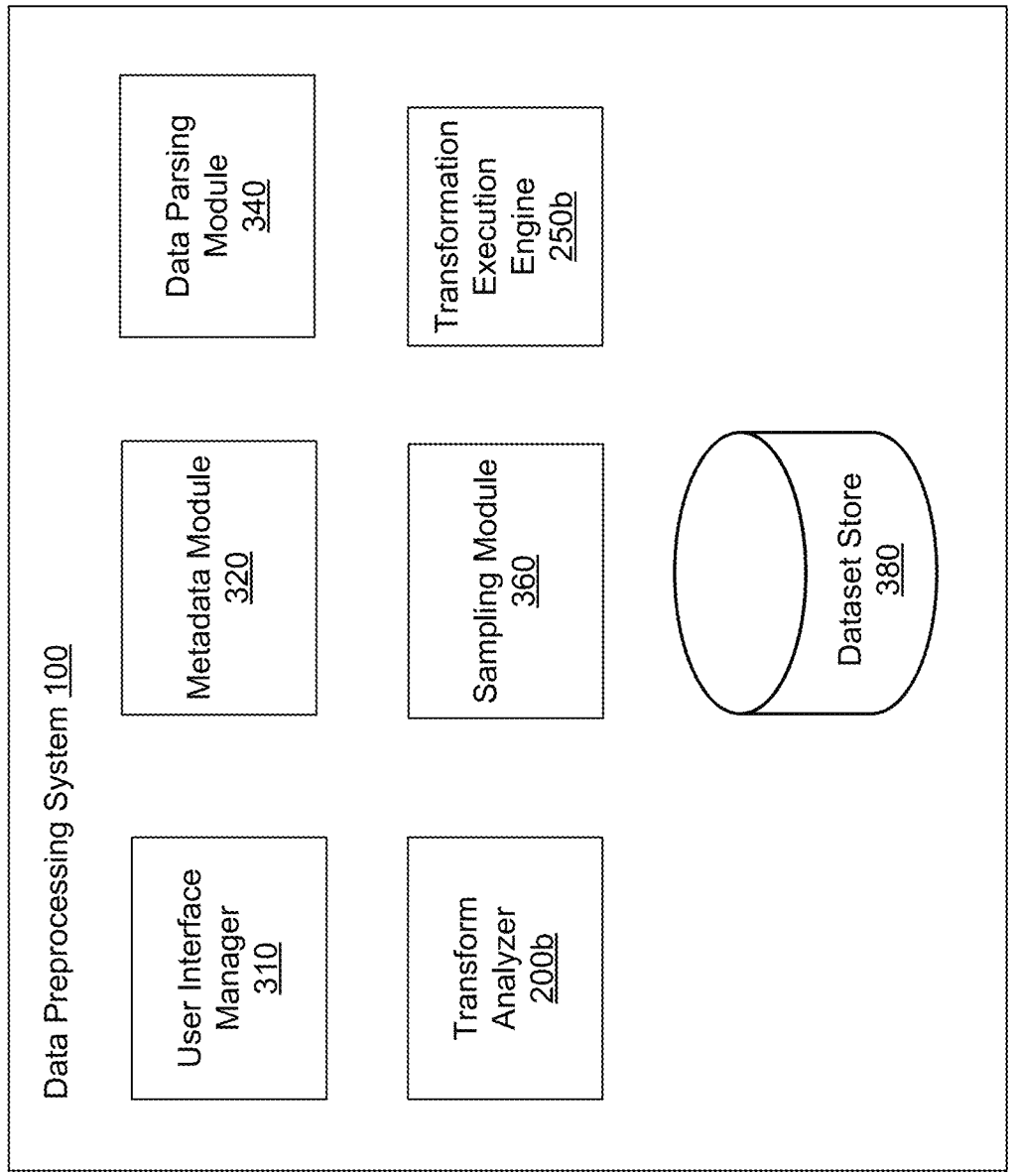
FIG. 3B shows the architecture of a data preprocessing system for preprocessing data for big data analysis, according to an embodiment.

FIG. 3B shows the architecture of a data preprocessing system for preprocessing data for big data analysis, according to an embodiment. The data preprocessing system 100 includes a user interface manager 310, a metadata module 320, a transformation recommendation module 350, a transformation execution engine 250, a sample store 330, a transformation script store 370, and a dataset store 380. In some embodiments, the data preprocessing system 100 includes other modules not described herein. Functionality indicated as provided by a particular module may be implemented by other modules instead.

Some of these modules are described above in connection with FIG. 3A. For example, a client application 210 may execute an operation on the client device 230 or send a request to the data preprocessing system 100 to perform the same operation. Some of the modules are stored on the data preprocessing system 100 so as to allow processing of the entire data set or a larger subset of the dataset. For example, the transform analyzer 200*a* of the client application 210 performs analysis of transformation operations in the client device 230 and the transform analyzer 200*b* of the data preprocessing system 100 performs analysis of transformation operation on the entire dataset stored in the dataset store 380 or on a subset of the dataset. Similarly, the transformation execution engine 250*a* of the client application 210 executes transformation on data of a sample stored in the client device 230 and the transformation execution engine 250*b* of the data preprocessing system 100 executes transformation on the entire dataset stored in the dataset store 380 or on a subset of the dataset.

The user interface manager 310 configures and presents various user interfaces to a client device 230 allowing a user to interact with the data preprocessing system 100. The user interfaces configured by the user interface manager 310 allow the user to identify datasets, specify transformations to be performed on the datasets, present information describing the datasets and so on. Various example user interfaces are described herein and presented as screenshots, for example, in FIGS. 4, and 9-18.

In an embodiment, the user interface manager 310 configures a markup language document, for example, an HTML (hypertext markup language) document corresponding to a user interface. The user interface manager 310 sends the markup language document for presentation via an internet browser (that represents a client application 210) executing on a client device 230.

The dataset store 380 stores datasets and metadata describing the datasets. In an embodiment, the data preprocessing system 100 presents a user interface to a user allowing the user to specify a source of dataset. The user interface is presented to the user via the client application 210. The data preprocessing system 100 receives data for the dataset from the source and stores the dataset in the dataset store 380. The source of the dataset can be a file stored locally on the system executing the data preprocessing system 100, on a client device 230 used to provide the information, or on an external system. The data preprocessing system 100 receives information identifying the dataset, for example, a file address, a URL, or information identifying a data stream.

The metadata module 320 determines metadata describing the datasets received by the data preprocessing system 100. In an embodiment, the metadata module 320 takes a sample of rows and identifies row separators and column separators. By analyzing the various data values corresponding to columns, the metadata module 320 infers types of each column. In an embodiment, the metadata module 320 sends information describing the various column types to the user via the user interface manager 310. The user interface manager 310 presents the inferred metadata describing the various columns to the user via the client application 210. The client application 210 allows the user to modify the inferred column types, thereby reassigning one or more column types to a manually specified data types. The metadata module 320 receives the manually specified column types and updates the metadata stored in the dataset store 380 accordingly.

The data parsing module 340 parses data received by the data preprocessing system 100 to determine various parts of the data. The data parsing module 340 identifies record separators, for example, based on newline characters to determine where one record of the dataset ends and the next record begins. The data parsing module 340 may also be stored in the client application 210 (not shown in FIG. 3A).

User Interface for Preprocessing Data for Big Data Analysis

Figure 4:
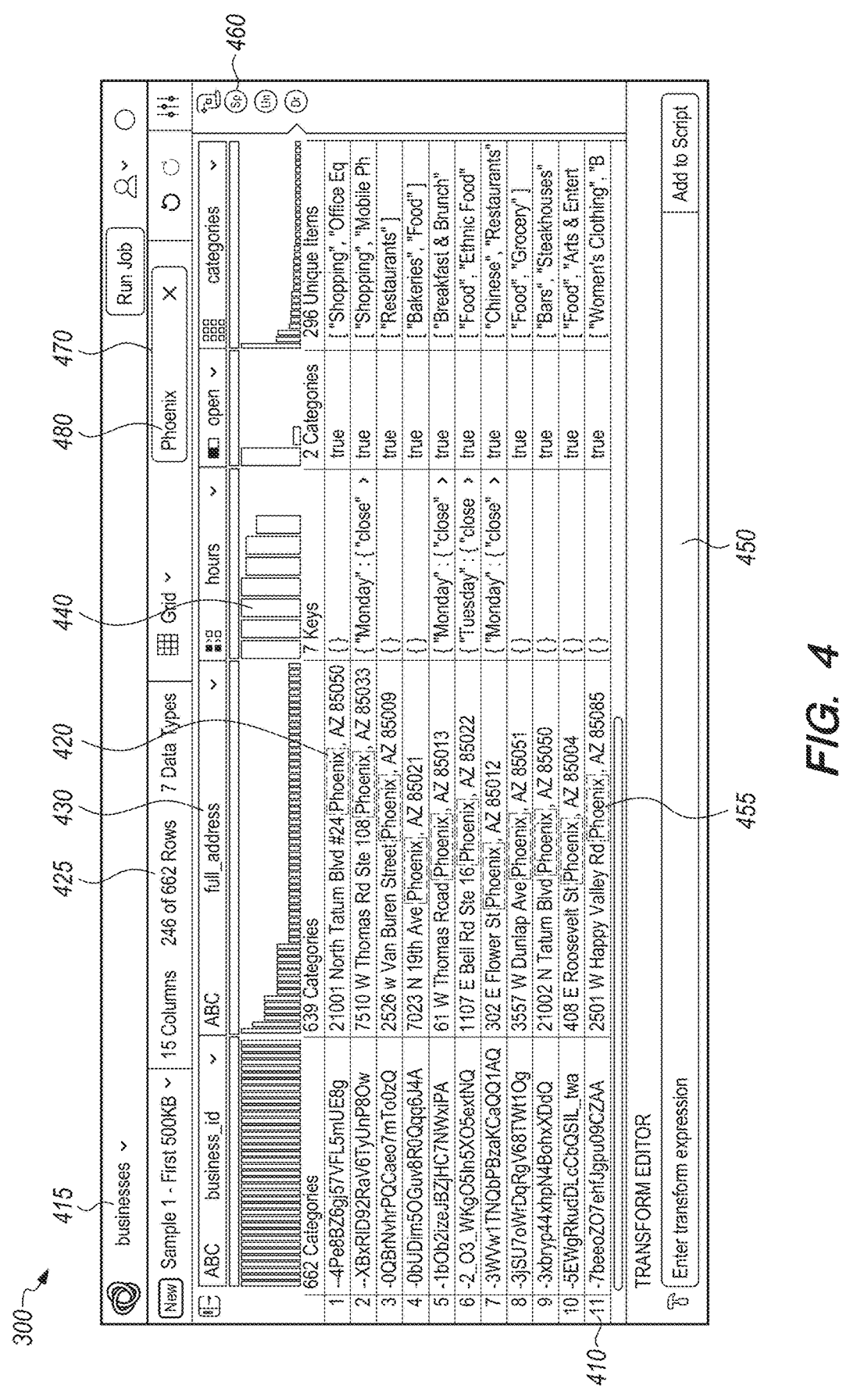

The data preprocessing system 100 allows users to interact with the data being analyzed for purposes of defining various transformations and generating samples of data. The user interface manager 310 renders user interfaces and sends information describing a user interface for presentation to the user via the client application 210. The screenshot illustrated in FIG. 4 is an example of a user interface presented to a user via the client application 210. The data preprocessing system 100 can configure the user interfaces in various ways, for example, by using different widgets than those indicated in the user interfaces, arranging the various user interface elements in different positions than indicated, and so on.

FIG. 4 shows a screenshot of a user interface illustrating various interactions with the data preprocessing system, according to an embodiment. The user interface 300 may be presented by the client application 210 via the client device 230. The user interface 300 presents information describing a sample of a dataset stored on the data preprocessing system 100. The user interface 300 presents the data of various attributes in textual form as well as using a visual representation, for example, histograms.

The user interface 300 shown in FIG. 4 shows information describing a dataset identified by the dataset identifier 415 (e.g., "Farmers Market Dataset".) A user may upload the dataset from a source of dataset that can be an external system, a file stored on a local machine or in the cloud, or any other mechanism for storing the data. The user specifies a dataset identifier 415 for each dataset that is loaded. The process of loading the dataset is not illustrated in the screenshot of FIG. 4 and occurs before the data preprocessing system 100 presents the user with the screenshot shown in FIG. 4.

The user interface 300 shown in FIG. 4 presents a subset of data of the dataset being processed, for example, a sample of a dataset stored on the data preprocessing system 100. The user interface may show only a subset of the sample. The data of the dataset shown in FIG. 4 represents information describing farmers markets.

The dataset includes a set of attributes 430 (an attribute may also be referred to as a data field.) Each attribute stores a particular type of data. For example, the attribute 430b stores a URL (uniform resource locator), the attribute 430a stores a textual description of a farmer's market. As shown in FIG. 4, each attribute 430 is represented as a column with the name of the attribute 430 displayed at the top of the column.

A type of the attribute is associated with certain formatting rules (or type rules) associated with the data. The formatting rules specify characteristics of the data of the attribute. The attribute 430b represents a URL that is expected to be of the format "http:" followed by a website address. The attribute 430 storing description of the farmer's markets may be associated with the attribute 430 that the text representing the description may not include certain special characters, such as '?'.

The subset of data presented in the user interface 300 comprises a plurality of records. Each record comprises values for attributes of the dataset. A value may be empty. A record is identified by a record identifier 410 that represents a unique value associated with the record. As shown in FIG. 4, the data of the dataset is organized as rows and columns, with each column representing an attribute and each row representing a record.

An attribute 430 may store data that does not conform to the formatting rules associated with the attribute. For example, data element 420a stores value "http;www.highlandsnj.com" that does not conform to the formatting rules of the attribute. Specifically, the data element 420a is not of the form "http:" followed by the web page address since it stores a prefix "http;". Similarly, data element 420b does not conform to the formatting rules of the description field since it includes '?' characters.

The user interface 300 presents statistical information 425 describing the attributes. As shown in FIG. 4, the user interface 300 shows visualization of the data distribution 440 of each field. The data distribution 440 is shown using a visual representation such as a chart. In an embodiment, a visual representation of an attribute shows geometric shapes (for example, rectangles or bars) representing statistical information describing the attribute.

As an example, statistical information describing an attribute is shown as a histogram. The histogram may be represented as a bar chart such that each bar represents a distinct data value of the attribute. Alternatively, each bar may represent a set of values of the data elements of the attribute. For example, if an attribute occupies a very large number of distinct values, the data preprocessing system 100 divides the attribute values into buckets. Each bar of the histogram displayed represents a bucket representing a set or range of values of the attribute.

The user interface 300 allows users to interact with the geometric shapes of the visual representation of an attribute, for example, bars of a histogram representing the data distribution 440 of the attribute. For example, if a user hovers over (or selects) a particular bar of the histogram with a pointing devices such as a mouse, the user interface 300 displays information describing that particular bar including the number of elements of the dataset having the data value or data values associated with the bar and/or the data value or data values corresponding to the bar. Other interactions of the user with the bar are further described herein.

The user interface 300 shown in FIG. 4 presents the user with a text field 450 for allowing users to input transformations. A user may specify a transformation (also referred to as transformation rules or transformation operation or a transform) for preprocessing the data of a dataset thereby increasing the amount of data that can be analyzed by the big data analysis system 130. For example, the transformations may process data elements having data formatting errors as described above to eliminate the errors.

The transformations added by the user are included in the transformation script 460. FIG. 4 shows the transformation script as empty since the user has not yet added any transform operations to the transformation script 460. However, as the user interacts with the dataset via the user interface 300, the user adds transformations using the text field 450 that are included in the transformation script 460.

The user interface 300 presents a search window 470 that allows users to enter search terms 480. The client application 210 performs a search for the search term in the sample of the dataset stored on the client device 230. As shown in FIG. 4, the user entered a search term "Phoenix." In an embodiment, the user interface 300 highlights all occurrences of the search term, i.e., search hits 455 in any value of the dataset displayed on the screen independent of the row or column in which the search term occurs.

Overall Process for Preprocessing Data

Figure 5:
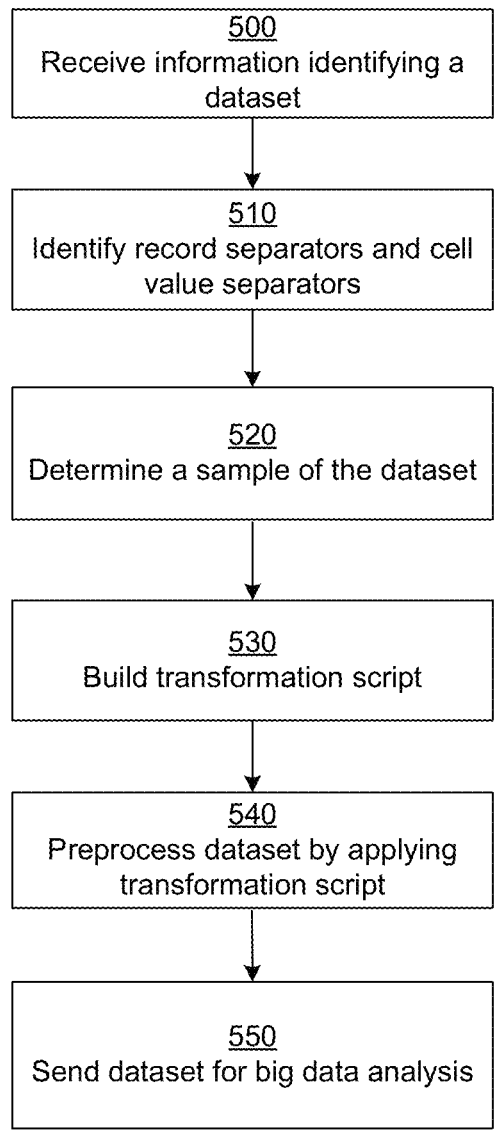
FIG. 5 shows the overall process for preprocessing data in preparation for analysis by a big data analysis system, according to an embodiment.

FIG. 5 shows the overall process for preprocessing data in preparation for analysis by a big data analysis system, according to an embodiment. In an embodiment, the data preprocessing system 100 performs the steps of the process illustrated in FIG. 5. Various steps discussed can be executed in an order different from that shown herein. Furthermore, specific steps can be executed by modules different from those indicated herein.

The user interface manager 310 receives 500 information identifying a dataset. The information identifying the dataset may be an address of a file stored locally on the data preprocessing system 100, a URI (uniform resource identifier) of a file on a remote system, a file on an external storage attached to the data preprocessing system, and so on. The data preprocessing system 100 uploads the dataset and may store the dataset in the dataset store 380 or may simply store metadata describing the data in the dataset store 380 such that the data itself may be retrieved from the source identified.

The data parsing module 340 parses the data of the dataset and identifies 510 the record separators and cell value separators. The data parsing module 340 also determines any structural information of the individual cell values, for example, whether a cell stores a single value, an array value, a nested data structure, and so on.

The sampling module 360 samples the dataset to determine 520 a sample dataset for preprocessing. Typically, a dataset being processed by the big data analysis system 130 is large. As a result, preprocessing based on the entire dataset can be a slow process. Therefore, the sampling module 360 determines 520 a sample of the dataset. The data preprocessing system 100 presents the sample of the dataset or a portion of the sample of the dataset to the user via the client application 210.

The data preprocessing system 100 builds 530 the transformation script for preprocessing the data via interactions with a user. The data preprocessing system 100 builds the transformation script by interacting with the user via the client application 210. The interactions with the users include analyzing each transformation using the sample of datasets. The client application 210 (or the data preprocessing system 100) recommends transformation to the user based on interactions of the user. The client application 210 receives selections of the recommended transformations or new transformations provided by the user. The data preprocessing system 100 builds the transformation script using the transformations selected or provided by the user. The transformation script comprises a sequence (or series) of transformations. These transformations transform the data so as to conform at least a portion of the data of the dataset to a form that can readily be processed by the big data analysis system 130.

The data preprocessing system 100 (or another system to which the data and the transformation scripts are transmitted) preprocesses 540 the entire dataset that needs to be analyzed by executing the transformation script on the dataset. In an embodiment, the data preprocessing system 100 reads records of the dataset and executes the transformation script on the records. The data preprocessing system 100 sends 550 the preprocessed dataset for analysis by the big data analysis system 130. The amount of data of the preprocessed dataset that can be analyzed by the big data analysis system 130 is larger than the amount of the original data from the input dataset that can be analyzed by the big data analysis system 130. This is so because a larger portion of the preprocessed dataset conforms to the formatting rules of the big data analysis system 130.

Overall Process for Analyzing Transformation Operations

Figure 7:
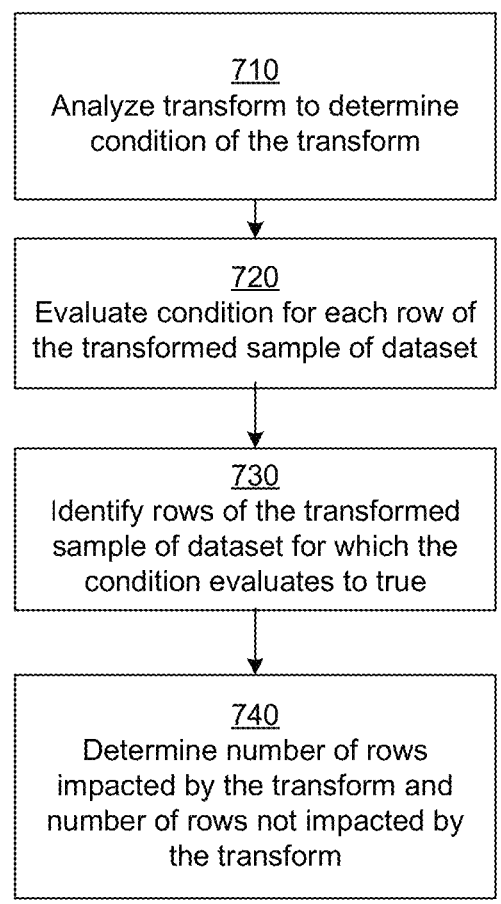
FIG. 7 shows the process of measuring impact of a transform on a dataset, according to an embodiment.

FIG. 7 shows the process of measuring impact of a transform on a dataset, according to an embodiment. In an embodiment, all steps may be executed by the client application 210. In other embodiments, some of the steps may be executed on the client device 230 and some by modules stored on the data preprocessing system 100.

Figure 6:
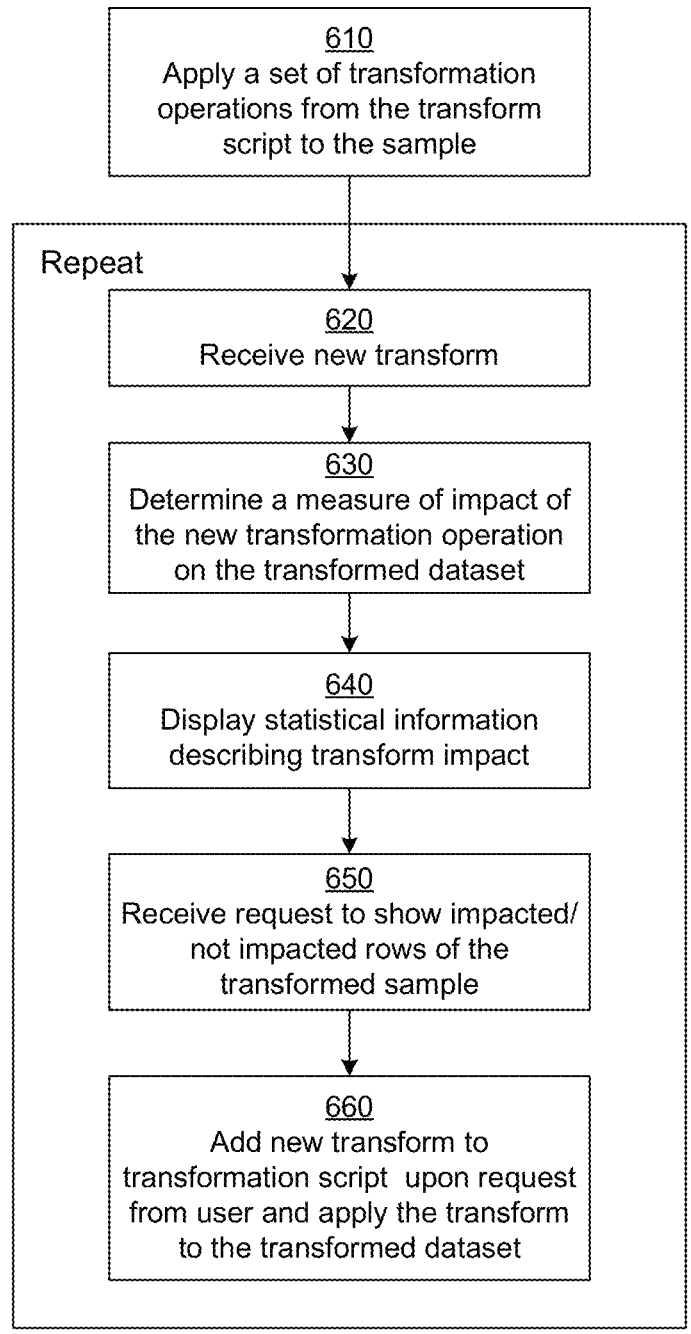
FIG. 6 shows the overall process analyzing transforms for developing a transformation script, according to an embodiment.

The transformation execution engine 250a applies 610 a set of transformation operations to a sample of dataset being processed. The set of transformations represents the transformations stored in the transformation script that have been developed so far. These transformations may have been applied during previous iterations of the process illustrated in FIG. 6.

The client application 210 repeats the following steps 620, 630, 640, 650, and 660 as many times as the user requests. A user interacts with the user interface 300 causing the client application 210 to perform these steps. These steps represent a workflow scenario in which a user analyzes transformation operations to determine whether a transformation operation needs to be added to a transformation script being developed. A user may a user may analyze several transformations before selecting one for adding to the transformation script. Accordingly, steps 620, 630, 640, and 650 may be repeated at a higher frequency than step 660.

The transform analyzer 200a of the client application 210 receives 630 a new transformation operation. The transform analyzer 200a determines 630 a measure of impact of the new transformation operation on the transformed dataset. The transform analyzer 200a determines the measure of impact of the new transformation operation based on the number of values of the transformed sample of the dataset that are impacted by (or affected by) the transformation. Further details of step 630 are provided in FIG. 7.

The data analyzer 305 determines statistical information describing the impact of the new transformation operation.

The data analyzer 305 provides statistical information describing the impact of the new transformation operation to the user interface 300. The user interface 300 displays 640 the statistical information describing impact of the new transformation operation.

In an embodiment, the user interface 300 modifies the histograms of the different attributes based on the values of the transformed sample of dataset impacted by the new transformation operation. The user interface 300 changes one or more properties of each bar of the histogram based on the number of impacted values or rows of the dataset for the range of attribute values associated with the bar. Accordingly, the user interface 300 shows a bar associated with a range of attribute value has having a property value X1 if the number of impacted values or rows of the dataset is N1 for the range of attribute value and a property value X2 if the number of impacted values or rows of the dataset is N2 (distinct from N1) for the range of attribute value. The property of the bar may be a color of the bar, a shading of a given color of the bar, or a text value written within the bar. On the other hand if a bar B1 is associated with a range R1 and a bar B2 is associated with range R2 and both range R1 and R2 have the same number of impacted values or rows of the dataset, the user interface 300 shows both the bars B1 and B2 has having the same value of that particular property.

In an embodiment, the client application 210 receives a request to show the rows impacted by the new transformation operation (or the rows not impacted by the new transformation operation). The transform analyzer 200a selects the requested rows and presents them using the user interface 300.

The above steps 620, 630, 640, 650, and 660 may be repeated for each transformation added to the transformation script based on user requests. Once the transformation script is complete, the user sends the transformation script to the data preprocessing system 100 for preprocessing the entire dataset using the transformation script. The data preprocessing system executes the transformation script on the entire dataset for sending the transformed dataset to the big data analysis system 130.

In an embodiment, the data analyzer 305 determines statistical information describing the values impacted by the new transformation via the user interface 300 and presents the information via the user interface 300. For example, the data analyzer 305 determines the number of rows such that at least one value in the row is impacted by the transformation operation. This numeric value of the number of rows is presented via the user interface 300. Similarly, the data analyzer 305 determines the number of columns such that at least one value in the column is impacted by the transformation operation. This numeric value of the number of columns is presented via the user interface 300.

The user is presented with one or more buttons via the user interface 300 that allow the user to request rows impacted by the new transformation operation to be presented. For example, the user interface 300 receives a request from the user to present only rows that have rows impacted by the new transformation operation. In response, the data analyzer 305 identifies rows that are impacted (and excludes rows that are not impacted) and presents the identified rows via the user interface 300.

Similarly, the user interface 300 receives a request from the user to present only columns that include values impacted by the new transformation operation. In response, the transform analyzer 200a identifies columns that include impacted values (and excludes columns that do not have any impacted) and presents the identified columns via the user interface 300. As another example, the user interface 300 receives a request from the user to present only rows and columns that have values impacted by the new transformation operation. In response, the data analyzer 305 identifies rows that include values impacted by the new transformation operation as well as columns that include values impacted by the new transformation operation (and excludes rows and columns that do not have any impacted values). The user interface 300 presents the identified rows via the user interface 300 such that only the identified columns are presented for each row.

In embodiments in which a histogram modified based on impacted values is presented, the user interface 300 receives selection of one or more histogram bars for an attribute. For example, a user may select one or more bars having impacted values or the user may select one or more bars having no impacted. The user interface 300 generates a transformation that filters the rows of the sample to include only the selected ranges of the attribute. For example, the transformation recommendation module 350 generates a transformation that includes a condition similar to a "where" clause of a structured query language (SQL) "select" statement. The condition restricts the dataset to values of the selected attribute that lie within the ranges corresponding to the selected bars of the histogram.

FIG. 7 shows the process of measuring impact of a transformation operation on a dataset, according to an embodiment. The client application 210 receives a new transformation operation. The new transformation operation specifies a condition based on one or more attribute values. The new transformation operation takes an action to process a row if the condition evaluates to true for that particular row. For example, if the new transformation operation replaces occurrences of a term T1 in an attribute with another term T2, the condition of the transformation operation is that the attribute value includes the term T1. Accordingly, the transformation operation performs the replacing action if the attribute value includes the term T1. Similarly, a transformation may perform an extract operation that extracts a portion of an attribute value that matches a regular expression.

The transform analyzer 200a 710 analyzes the new transformation operation to identify the condition of the new transformation operation. The transform analyzer 200a evaluates 720 the determined condition for each row of the transformed sample of dataset. The transform analyzer 200a identifies 730 the rows (and corresponding attribute values) of the transformed sample of dataset for which the condition evaluates to true. The identified rows correspond to the rows impacted by the transformation operation. The data analyzer 305 determines 740 statistical information based on the impacted rows including number of rows impacted by the transformation operation and the number of rows that are not impacted by the transformation operation. In an embodiment, the data analyzer 305 determines distribution of the impacted rows across various ranges of attribute values corresponding to the histograms of various attributes displayed by the user interface 300.

In an embodiment, the client application 210 sends a request to the data preprocessing system 100 to provide a new sample of the dataset such that a transformed sample after applying the current transformation script has more than a threshold impacted values based on the new transformation operation. For example, assume that a user analyzes the new transformation operation using the client application 210 and determines that the sample of the dataset being processed has very few rows impacted by the transformation operation. The client application 210 sends a request to the data preprocessing system 100 to provide a sample having a threshold size such that every row of a transformed sample after applying the current transformation script has a value impacted by the new transformation operation. The client application 210 sends the new transformation and the sequence of transformations in the current transformation script to the data preprocessing system 100. The data preprocessing system 100 performs the following process.

Figure 8:
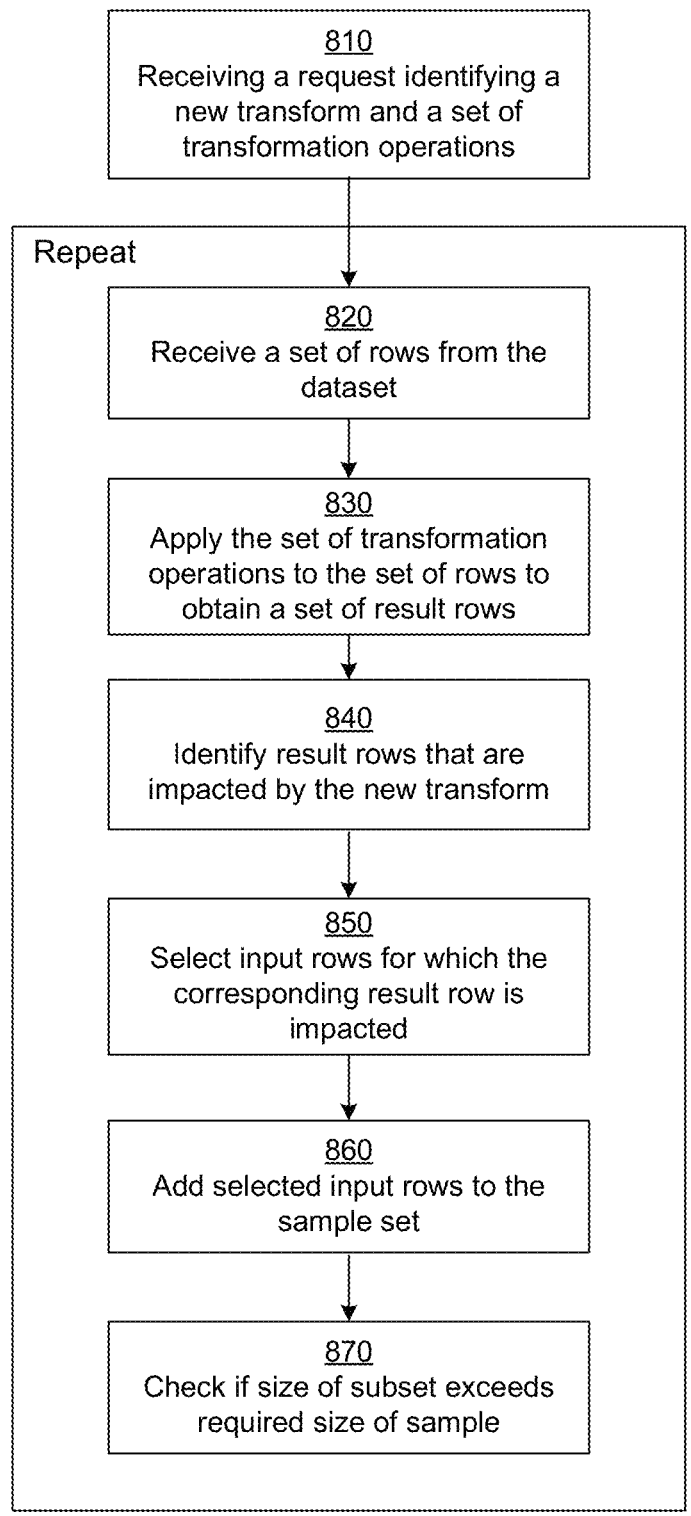
FIG. 8 shows the process of a server generating a sample having a specified number of impacted rows, according to an embodiment.

FIG. 8 shows the process of a server generating a sample having a specified number of impacted rows, according to an embodiment. The data preprocessing system 100 receives a request for a new sample of the dataset. The request identifies a new transformation and a sequence of transformation rules representing the current transformation script. The request may also specify a threshold value representing a size of the sample.

The data preprocessing system 100 repeats the following steps (820, 830, 840, 850, 860, and 870) to build a sample. The sampling module 360 receives 820 a set of rows from the dataset. The transformation execution engine 350*b* applies 830 the received sequence of transformations to the received set of rows. If the sequence of transformations maps a set of rows to a single result row, for example, by aggregating values, the number of result rows generated from the set of rows of the dataset is fewer than the number of rows received. In this situation, the transformation execution engine 350*b* tracks all the input rows that are associated with each result row.

The transformation execution engine 350*b* tracks the input rows of the received set of rows that were processed to obtain each row of the result set. The transform analyzer 200*b* evaluates the condition associated with the transformation operation against each result row. The transform analyzer 200*b* identifies rows of the result set for which the condition evaluates to true as the rows impacted by the transformation operation. The sampling module 360 selects 850 input rows that are associated with rows of the result set impacted by the transformation. The sampling module 360 adds 860 the identified rows to a new sample being built by the sampling module 360. In other words, the sampling module 360 skips input rows that do not result in result rows impacted by the transformation and does not add these rows to the sample being built. The sampling module 360 checks if the size of the new sample being built has reached a threshold value. If the sampling module 360 determines that the size of the new sample being built is below a threshold value, the sampling module 360 repeats the steps 820, 830, 840, 850, 860, and 870. If the sampling module 360 determines that the size of the new sample being built has reached or exceeds the threshold value, the sampling module 360 provides the new sample to the client application 210.

The data preprocessing system 100 determines the requested sample without processing all the rows of the dataset. The data preprocessing system 100 processes a subset of rows at a time, thereby incrementally building the requested sample. The data preprocessing system 100 when it reaches a requested size of the sample. Accordingly, the data preprocessing system 100 determines the requested sample by processing only a subset of the dataset. This allows efficiently processing large datasets. For example, if a dataset includes several million rows, the data preprocessing system 100 may be able to determine a requested sample by processing only a few thousand of the rows of the dataset. A technique that requires processing all rows of the dataset would be significantly inefficient compared to the process disclosed in FIG. 8.

User Interfaces Illustrating Impacts of Transformation Operations

FIG. 9 shows a user interface illustrating impact of an extract transformation operation, according to an embodiment. The user interface 300 receives a transform 910 that extracts a value from rows of the full address column and includes the extracted value in a result column. The transform 910 specifies components including a column name ("full_address") and a regular expression ("/^[a-zA-Z]*/") that matches values from the identified column if the address starts with a alphabetic word (instead of a numeric value). The user interface 300 shows a preview column 940 with the result of the transform. The transform analyzer 200 analyzes the transform 910 to identify the various components of the transform. The transform analyzer 200 also determines that the condition associated with the column comprises the regular expression. The user interface 300 presents statistical information 950 describing the number of rows that are impacted by the transform 910 and the number of columns impacted by the transform 910. As shown in FIG. 9, only one row 920 impacted by the transform and corresponding to the transformation output 930) is shown in the data that is presented to the user. The user can scroll through the data to view other rows impacted by the transform 910. However that is a time consuming and inefficient process. The user interface 300 allows the user to request all the rows impacted by the transform 910. In embodiment, each row showing the statistical information is a widget that allows the user to send a request. The user can click on the text specifying the number of impacted rows (stating: "Transformed—35 rows") to retrieve all impacted rows. The user can click on the text specifying the number of impacted columns (stating: "Transformed—2 columns") to retrieve all impacted columns.

FIG. 10 shows a user interface showing only rows impacted by an extract transformation operation, according to an embodiment. As shown, this view allows the user to analyze the impact of transform 910 better by reviewing all the rows impacted. The user can revert back to the view shown in FIG. 9 if needed. The user may further modify the transform 910 if necessary.

FIG. 11 shows a user interface showing only rows and columns impacted by an extract transformation operation, according to an embodiment. As shown in FIG. 11, the user requested only rows and columns that are impacted by the transform 910. This view excludes information that may not be necessary to analyze the transform 910. The user can revert back to the views shown in FIG. 9 or FIG. 10 if needed.

Figure 12:
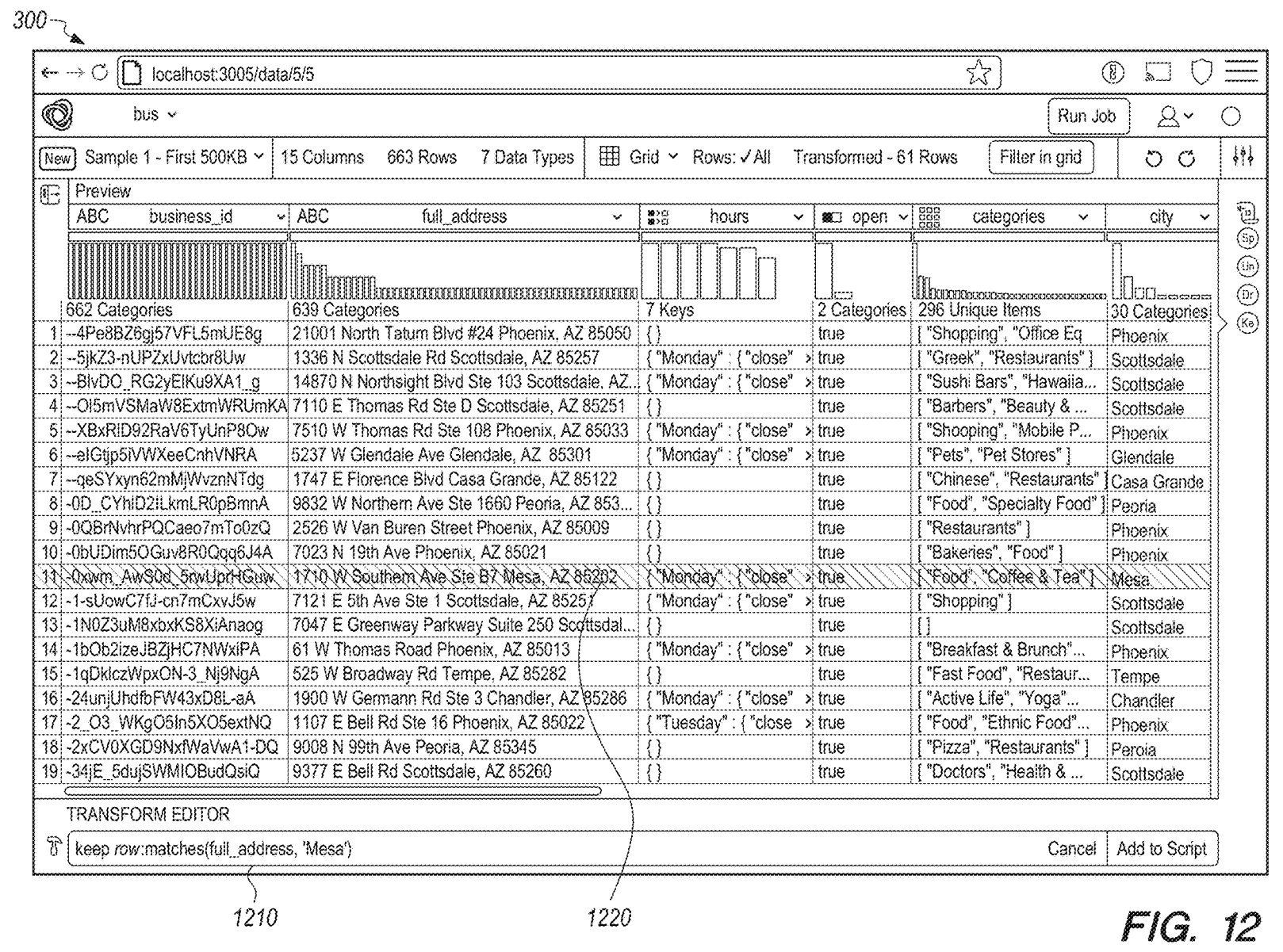

FIG. 12 shows a user interface illustrating impact of a keep transformation operation, according to an embodiment. The user interface 300 receives a transform 1210 that keeps rows that satisfy a particular condition. The transform 1210 identifies a column (the full_address column) and specifies a condition based on the value of the full_address column (or attribute). The transform 1210 specifies the condition ("matches(full_address, 'Mesa')".) Accordingly the transform 1210 specifies that upon execution, the transform 1210 will keep only rows in which the substring 'Mesa' occurs at least once, such as the impacted row 1220.

Figure 13:
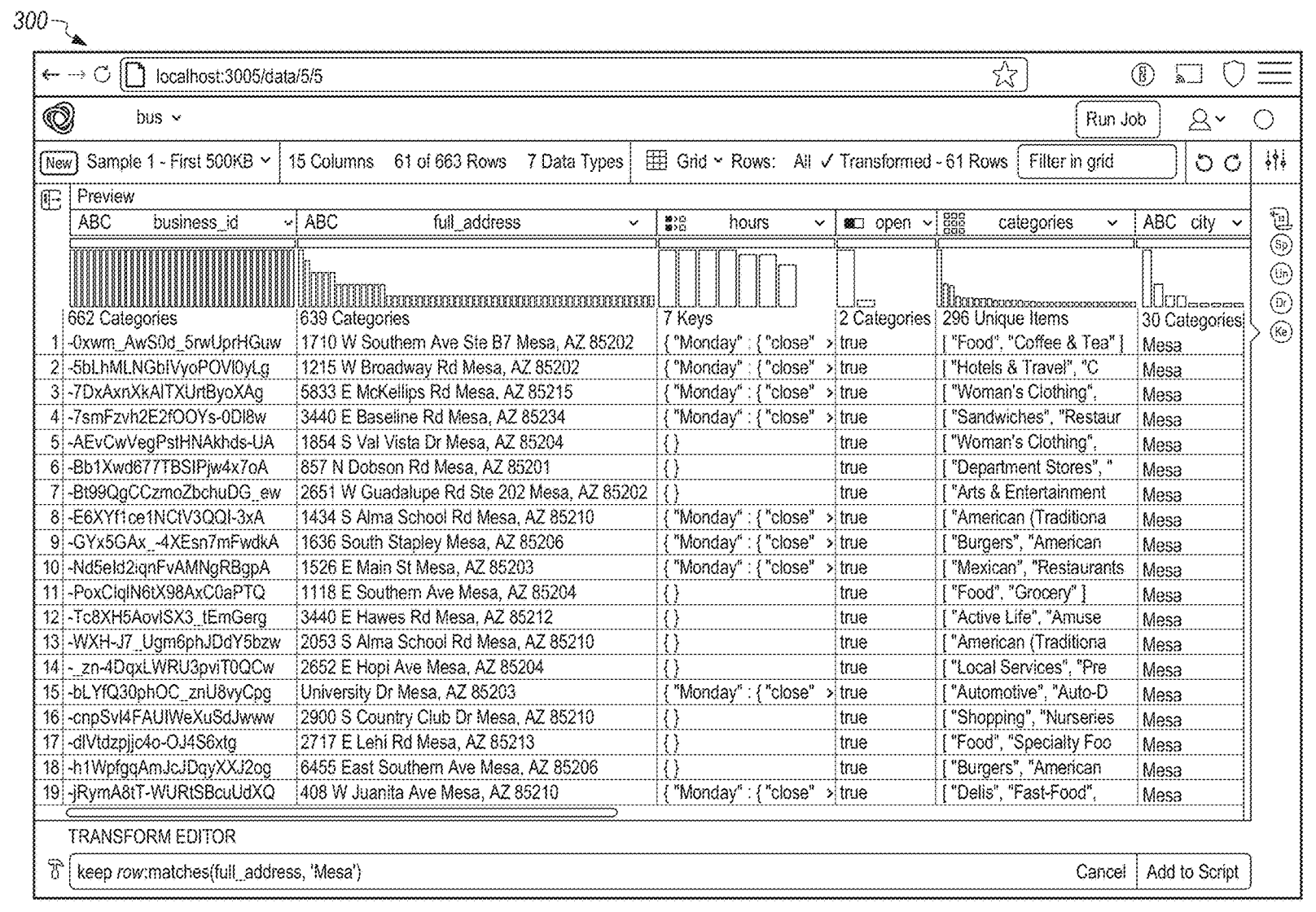

FIG. 13 shows a user interface showing only rows impacted by a keep transformation operation, according to an embodiment. As shown, this view allows the user to analyze the impact of transform 1210 better by reviewing all the rows impacted. The user can revert back to the view shown in FIG. 12 if needed.

FIG. 14 shows a user interface illustrating impact of a replace transformation operation, according to an embodiment. The user interface 300 receives a transform 1410 that replaces occurrences of a term1 in the values of a column with another term, say term2. The transform 1410 identifies a column (the full_address column) and specifies a term as a regular expression "/\bN/" as the term to be replaced by another term "North". Accordingly all occurrences of the term "N" as a substring are replaced by the term "North." The user interface 300 shows a preview of the effect of the transformation by indicating the portion to be deleted with a text with strike through and the text being added by highlighting it with a particular color (or with an underline). FIG. 14 shows a few impacted rows 1420.

Figure 15:
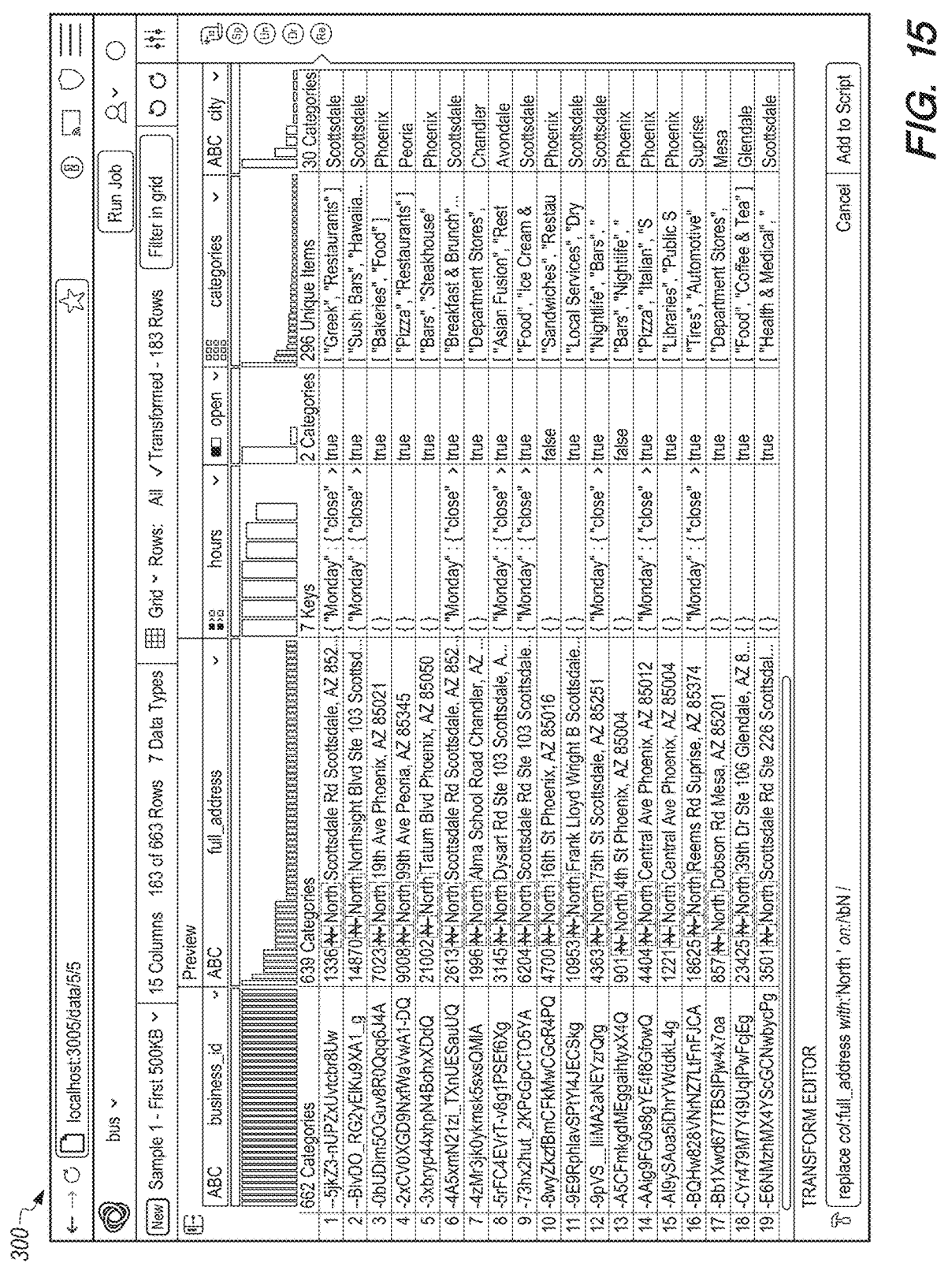

FIG. 15 shows a user interface showing only rows impacted by a replace transformation operation, according to an embodiment. As shown, this view allows the user to analyze the impact of transform 1410 better by reviewing all the rows impacted. The user can revert back to the view shown in FIG. 14 if needed.

Figure 16:
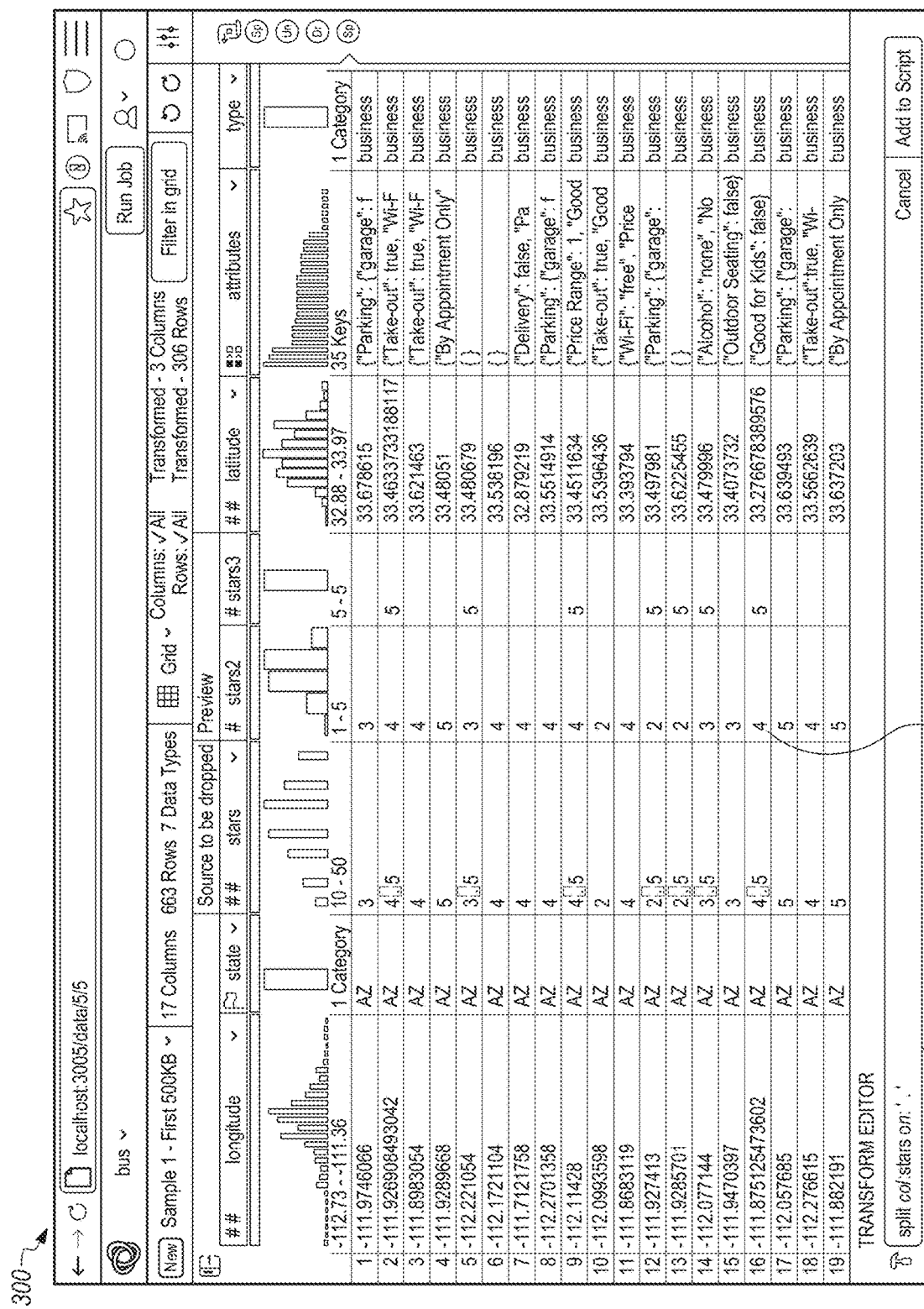
FIG. 16 shows a user interface illustrating impact of a split transformation operation, according to an embodiment.

FIG. 16 shows a user interface illustrating impact of a split transformation operation, according to an embodiment. The user interface 300 receives a transform 1610 that splits values from the column stars based on a separator '.' into two substring values, a value that occurs before the separator (stored in preview column stars2) and a value that occurs after the separator (stored in preview column stars3). The transform 1610 identifies a column (the stars column) and specifies the separator term (as '.'). FIG. 16 shows a few impacted rows 1620.

Figure 17:
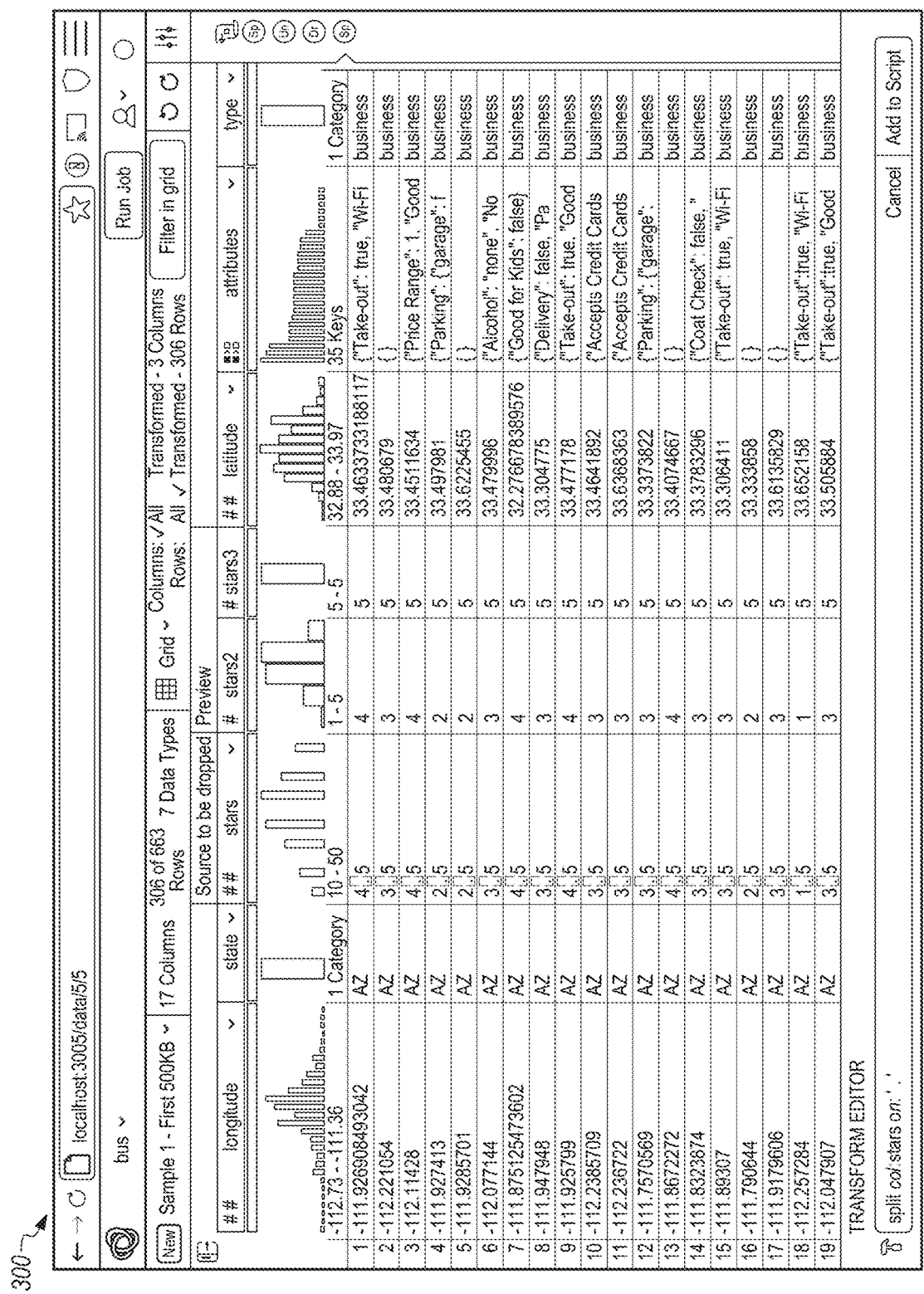
FIG. 17 shows a user interface showing only rows impacted by a split transformation operation, according to an embodiment.

FIG. 17 shows a user interface showing only rows impacted by the split transformation operation, according to an embodiment. As shown, this view allows the user to analyze the impact of transform 1610 better by reviewing all the rows impacted. The user can revert back to the view shown in FIG. 16 if needed.

Figure 18:
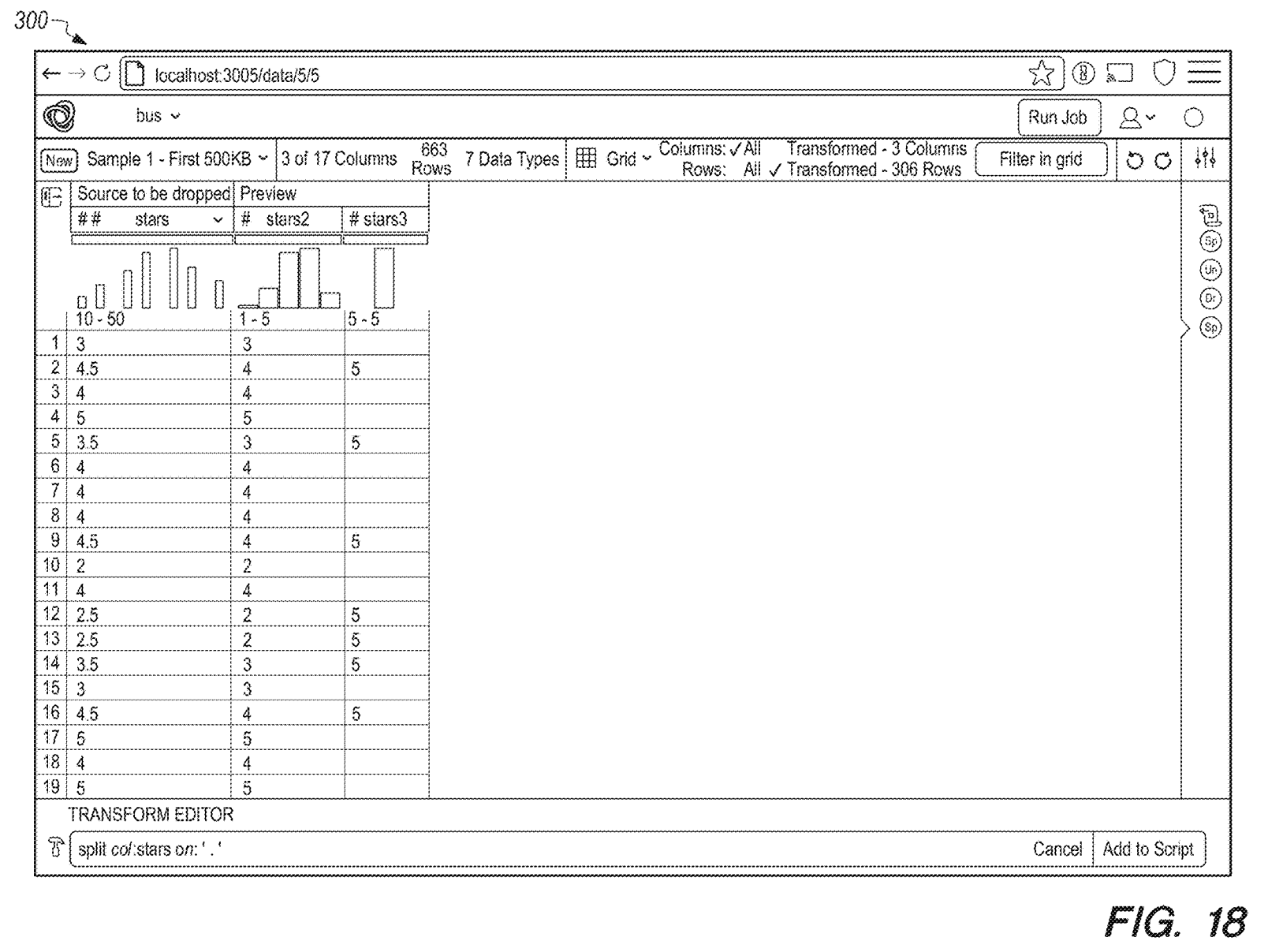

FIG. 18 shows a user interface showing only rows and columns impacted by a split transformation operation, according to an embodiment. As shown in FIG. 18, the user requested only rows and columns that are impacted by the transform 1610. This view excludes information that may not be necessary to analyze the transform 1610. The user can revert back to the views shown in FIG. 16 or FIG. 17 if needed.

Alternative Embodiments

It is to be understood that the figures and descriptions of the present invention have been simplified to illustrate elements that are relevant for a clear understanding of the present invention, while eliminating, for the purpose of clarity, many other elements found in a typical data preprocessing systems. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A method for analyzing a dataset, the method comprising:
   receiving information identifying a dataset, the dataset comprising a plurality of rows, each row comprising values of one or more attributes;
   storing a transformation script for processing the dataset, the transformation script including a set of transformation operations;
   generating a sample of the dataset comprising a subset of the plurality of rows;

applying the set of transformation operations of the transformation script to a sample of the dataset to obtain a transformed sample;
receiving a new transformation operation, wherein the new transformation operation specifies a condition based on attribute values of a row of the dataset, and is configured to process the row of the dataset to generate an output value in response to the condition evaluating as true for the row;
prior to adding the new transformation operation to the transformation script, presenting a user interface (UI) configured to present a preview of the impact of the transformation, the UI indicating a determined measure of impact of the new transformation operation on the transformed sample, wherein determining the measure of impact of the new transformation operation comprises:
  identifying rows of the transformed sample having attribute values that cause the condition specified by the new transformation operation to evaluate to true as rows impacted by the new transformation operation;
  determining statistical information describing rows of the transformed sample that are impacted by the new transformation operation; and
  presenting the statistical information describing rows of the transformed sample that are impacted by the new transformation operation;
responsive to the statistical information indicating that the number of rows of the transformed sample impacted by the new transformation operation does not exceed a threshold number, updating the sample such that the transformed sample after applying the transformation script has at least the threshold number of rows impacted by the new transformation operation;
responsive to presenting the statistical information describing rows of the transformed sample that are impacted by the new transformation, receiving a request to include the new transformation in the transformation script; and
adding the new transformation operation to the transformation script responsive to the request to generate an updated transformation script.

2. The method of claim 1, further comprising:
presenting one or more histograms describing one or more attributes of the transformed sample, each histogram visualizing an attribute of the transformed sample; and
wherein presenting the statistical information describing rows of the transformed sample that are impacted by the new transformation operation comprises, modifying appearance of one or more geometric shapes of a histogram of an attribute, the modifying comprising, changing the appearance of a first geometric shape associated with a first range of values of the attribute to look distinct from a second geometric shape associated with a second range of values of the attribute if the number of rows impacted by the new transformation operation having values of the attribute within the first range is different from the number of rows impacted by the new transformation operation having values of the attribute within the second range.

3. The method of claim 2, wherein changing the appearance of a geometric shape comprises changing one or more of: a color of the geometric shape, a width of the geometric shape, a shading of the geometric shape, or a text occurring within the geometric shape.

4. The method of claim 1, wherein presenting the statistical information describing rows of the transformed sample that are impacted by the new transformation operation comprises, presenting the number of rows impacted by the new transformation operation.

5. The method of claim 1, wherein presenting the statistical information describing rows of the transformed sample that are impacted by the new transformation operation comprises, presenting the number of columns impacted by the new transformation operation.

6. The method of claim 1, further comprising:
receiving a request for presenting rows impacted by the transformed sample; and
selecting one or more rows impacted by the transformed sample and sending for presentation.

7. The method of claim 1, further comprising:
preprocessing the input dataset using the transformation script; and
sending the preprocessed input dataset for analysis by the data analysis system.

8. The method of claim 1, wherein the dataset is a first sample of a larger dataset, the method further comprising:
receiving a request for a second sample having a particular rate of impact of the transform;
sending a request to the server for a second sample set, the request identifying the new transformation operation and the set of transformation operations; and
receiving the second sample of dataset from the server, wherein the server determines the second sample by applying the set of transformation operations to at least a portion of the dataset to obtain a transformed subset of the dataset.

9. The method of claim 1, wherein the condition specified by the new transformation operation evaluates as true for the row of the dataset if the row contains a first term, and wherein the output value generated by the new transformation operation corresponds to the row of the dataset in which occurrence of the first term are replaced with a second term.

10. The method of claim 1, wherein the condition specified by the new transformation operation evaluates as true for the row of the dataset if the row contains a separator term, and wherein the output value corresponds to an attribute value of the row split into a first substring and a second substring based upon the separator term.

11. The method of claim 1, wherein the condition specified by the new transformation operation evaluates as true for the row of the dataset if the row satisfies a join condition with a corresponding row of a target dataset.

12. The method of claim 1, wherein the UI displays a first view showing rows of the transformed sample, including both rows impacted by the new transformation operation and rows not impacted by the new transformation operation, and further comprising:
responsive to receiving a user input at a first interface element displayed in associated with the statistical information describing rows of the transformed sample that are impacted by the new transformation operation, changing the displayed UI to display a second view showing only rows of the transformed sample impacted by the new transformation operation.

13. A non-transitory computer readable storage medium storing instructions for:
receiving information identifying a dataset, the dataset comprising a plurality of rows, each row comprising values of one or more attributes;

storing a transformation script for processing the dataset, the transformation script including a set of transformation operations;

generating a sample of the dataset comprising a subset of the plurality of rows;

applying the set of transformation operations of the transformation script to a sample of the dataset to obtain a transformed sample;

receiving a new transformation operation, wherein the new transformation operation specifies a condition based on attribute values of a row of the dataset, and is configured to process the row of the dataset to generate an output value in response to the condition evaluating as true for the row;

prior to adding the new transformation operation to the transformation script, presenting a user interface (UI) configured to present a preview of the impact of the transformation, the UI indicating a determined measure of impact of the new transformation operation on the transformed sample, wherein determining the measure of impact of the new transformation operation comprises:

identifying rows of the transformed sample having attribute values that cause the condition specified by the new transformation operation to evaluate to true as rows impacted by the new transformation operation;

determining statistical information describing rows of the transformed sample that are impacted by the new transformation operation; and presenting the statistical information describing rows of the transformed sample that are impacted by the new transformation operation;

responsive to the statistical information indicating that the number of rows of the transformed sample impacted by the new transformation operation does not exceed a threshold number, updating the sample such that the transformed sample after applying the transformation script has at least the threshold number of rows impacted by the new transformation operation;

responsive to presenting the statistical information describing rows of the transformed sample that are impacted by the new transformation, receiving a request to include the new transformation in the transformation script; and adding the new transformation operation to the transformation script responsive to the request to generate an updated transformation script.

14. The non-transitory computer readable storage medium of claim 13, wherein the stored instructions further comprise instructions for:

presenting one or more histograms describing one or more attributes of the transformed sample, each histogram visualizing an attribute of the transformed sample; and wherein presenting the statistical information describing rows of the transformed sample that are impacted by the new transformation operation comprises, modifying appearance of one or more geometric shapes of a histogram of an attribute, the modifying comprising, changing the appearance of a first geometric shape associated with a first range of values of the attribute to look distinct from a second geometric shape associated with a second range of values of the attribute if the number of rows impacted by the new transformation operation having values of the attribute within the first range is different from the number of rows impacted by the new transformation operation having values of the attribute within the second range.

15. The non-transitory computer readable storage medium of claim 13, wherein presenting the statistical information describing rows of the transformed sample that are impacted by the new transformation operation comprises, presenting the number of rows impacted by the new transformation operation.

16. The non-transitory computer readable storage medium of claim 13, wherein presenting the statistical information describing rows of the transformed sample that are impacted by the new transformation operation comprises, presenting the number of columns impacted by the new transformation operation.

17. The non-transitory computer readable storage medium of claim 13, wherein the stored instructions further comprise instructions for:

receiving a request for presenting rows impacted by the transformed sample; and selecting one or more rows impacted by the transformed sample and sending for presentation.

18. The non-transitory computer readable storage medium of claim 13, wherein the stored instructions further comprise instructions for:

preprocessing the input dataset using the transformation script; and sending the preprocessed input dataset for analysis by the data analysis system.

19. The non-transitory computer readable storage medium of claim 13, wherein the dataset is a first sample of a larger dataset, wherein the stored instructions further comprise instructions for:

receiving a request for a second sample having a particular rate of impact of the transform;

sending a request to the server for a second sample set, the request identifying the new transformation operation and the set of transformation operations; and receiving the second sample of dataset from the server, wherein the server determines the second sample by applying the set of transformation operations to at least a portion of the dataset to obtain a transformed subset of the dataset.

20. A computer-system comprising:

a computer processor; and a computer readable non-transitory storage medium storing instructions that cause the computer processor to perform steps for:

receiving information identifying a dataset, the dataset comprising a plurality of rows, each row comprising values of one or more attributes;

generating a sample of the dataset comprising a subset of the plurality of rows;

storing a transformation script including a set of transformation operations;

applying the set of transformation operations of the transformation script to the sample of dataset to obtain a transformed sample;

receiving a new transformation operation, wherein the new transformation operation specifies a condition based on attribute values of a row of the dataset, and is configured to process the row of the dataset to generate an output value in response to the condition evaluating as true for the row;

prior to adding the new transformation operation to the transformation script, presenting a user interface (UI) configured to present a preview of the impact of the transformation, the UI indicating a determined measure of impact of the new transformation operation on the transformed sample, wherein determining the measure of impact of the new transformation operation comprises:
  identifying rows of the transformed sample having attribute values that cause the condition specified by the new transformation operation to evaluate to true as rows impacted by the new transformation operation;
  determining statistical information describing rows of the transformed sample that are impacted by the new transformation operation; and
  presenting the statistical information describing rows of the transformed sample that are impacted by the new transformation operation;
responsive to the statistical information indicating that the number of rows of the transformed sample impacted by the new transformation operation does not exceed a threshold number, updating the sample such that the transformed sample after applying the transformation script has at least the threshold number of rows impacted by the new transformation operation;
receiving a request for presenting rows impacted by the transformed sample; and
selecting one or more rows impacted by the transformed sample and sending for presentation.

21. The computer system of claim 20, wherein the non-transitory computer readable storage medium stores instructions for:
  presenting one or more histograms describing one or more attributes of the transformed sample, each histogram visualizing an attribute of the transformed sample; and
wherein presenting the statistical information describing rows of the transformed sample that are impacted by the new transformation operation comprises, modifying appearance of one or more geometric shapes of a histogram of an attribute, the modifying comprising, changing the appearance of a first geometric shape associated with a first range of values of the attribute to look distinct from a second geometric shape associated with a second range of values of the attribute if the number of rows impacted by the new transformation operation having values of the attribute within the first range is different from the number of rows impacted by the new transformation operation having values of the attribute within the second range.

22. The computer system of claim 20, wherein the non-transitory computer readable storage medium stores instructions for:
  receiving a request for presenting rows impacted by the transformed sample; and
  selecting one or more rows impacted by the transformed sample and sending for presentation.

23. The computer system of claim 20, wherein the non-transitory computer readable storage medium stores instructions for:
  preprocessing the input dataset using the transformation script; and
  sending the preprocessed input dataset for analysis by the data analysis system.

24. The computer system of claim 20, wherein the dataset is a first sample of a larger dataset, wherein the non-transitory computer readable storage medium stores instructions for:
  receiving a request for a second sample having a particular rate of impact of the transform;
  sending a request to the server for a second sample set, the request identifying the new transformation operation and the set of transformation operations; and
  receiving the second sample of dataset from the server, wherein the server determines the second sample by applying the set of transformation operations to at least a portion of the dataset to obtain a transformed subset of the dataset.

* * * * *